(12) United States Patent
Oide et al.

(10) Patent No.: US 6,714,531 B1
(45) Date of Patent: Mar. 30, 2004

(54) METHOD AND DEVICE FOR AVOIDING ERROR OF POINTER PROCESS IN SDH RADIO COMMUNICATION

(75) Inventors: Kenichi Oide, Kawasaki (JP); Satoru Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/160,605

(22) Filed: Sep. 25, 1998

(30) Foreign Application Priority Data

Mar. 18, 1998 (JP) .......................................... 10-068151

(51) Int. Cl.⁷ .................................................. H04J 3/24
(52) U.S. Cl. ...................................... 370/349; 370/503
(58) Field of Search ................................ 370/389, 349, 370/350, 503, 509, 532, 535; 359/15, 123, 135

(56) References Cited

U.S. PATENT DOCUMENTS

| | | | | | |
|---|---|---|---|---|---|
| 5,315,594 A | * | 5/1994 | Noser | .......................... | 370/278 |
| 5,544,172 A | * | 8/1996 | Abbas | .......................... | 370/505 |
| 5,675,585 A | * | 10/1997 | Bonnot et al. | .............. | 370/506 |
| 5,737,373 A | * | 4/1998 | Sato et al. | .................... | 370/516 |
| 5,751,720 A | * | 5/1998 | Uematsu et al. | ............ | 370/503 |
| 5,784,380 A | * | 7/1998 | Kuwahara | .................... | 370/509 |
| 5,907,682 A | * | 5/1999 | Miyazawa | .................. | 709/230 |
| 6,041,051 A | * | 3/2000 | Doshi et al. | ................ | 370/352 |

FOREIGN PATENT DOCUMENTS

| | | |
|---|---|---|
| JP | 5-344089 | 12/1993 |
| JP | 6-311145 | 11/1994 |

* cited by examiner

*Primary Examiner*—Douglas Olms
*Assistant Examiner*—Bob A. Phunkulh
(74) *Attorney, Agent, or Firm*—Katten Muchin Zavis Rosenman

(57) ABSTRACT

A method of preventing an error of a pointer process in an SDH radio device which receives an STM frame having a section overhead and a payload therein includes the steps of distributing a pointer to unused bytes or undefined bytes in the section overhead of the STM frame, the pointer indicating a start position of multiplex data in the payload of the STM frame, and transmitting the STM frame to the SDH radio device.

14 Claims, 22 Drawing Sheets

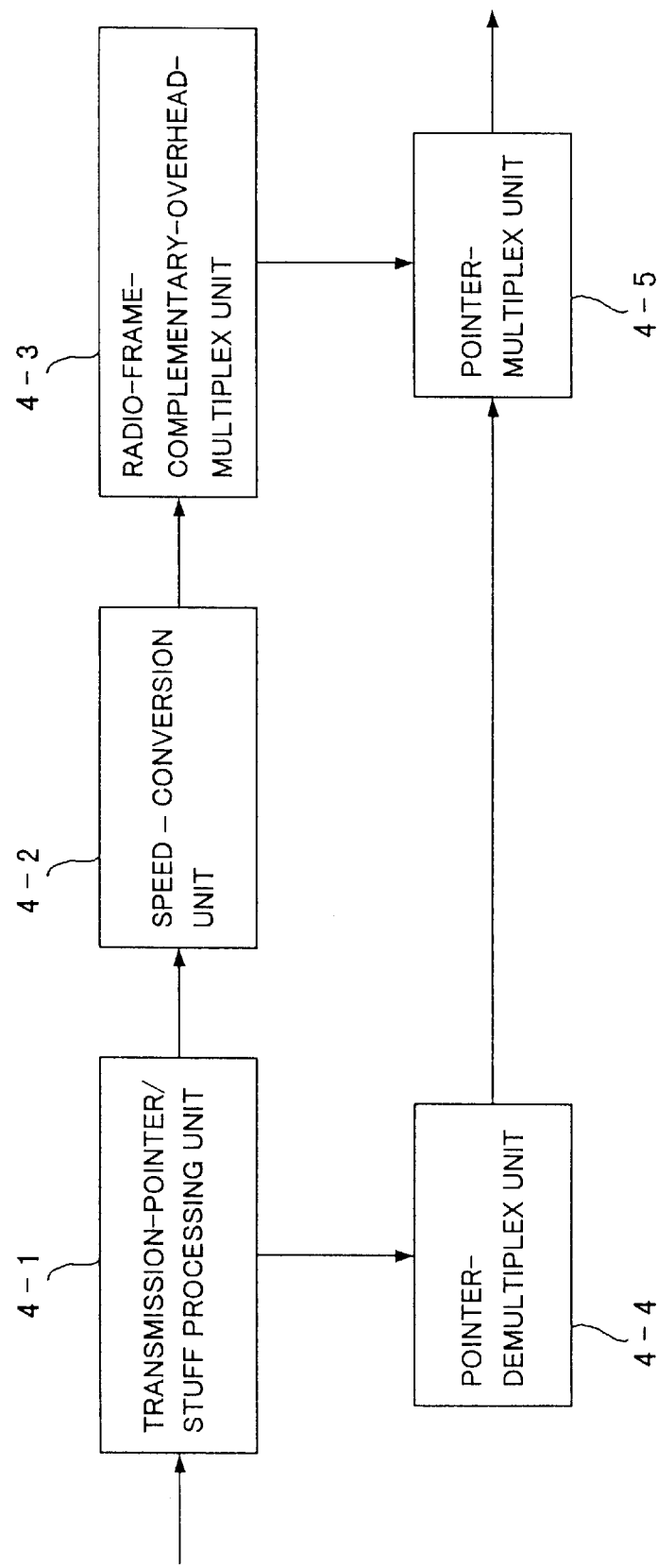

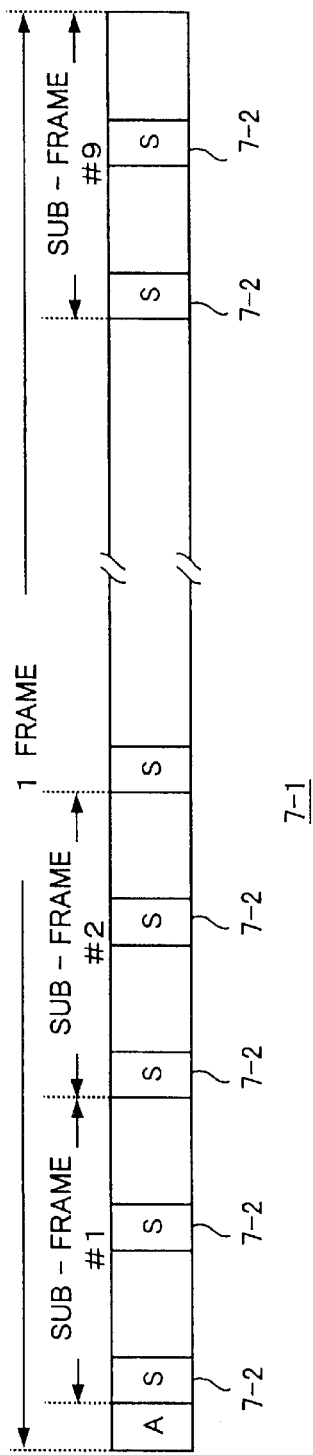

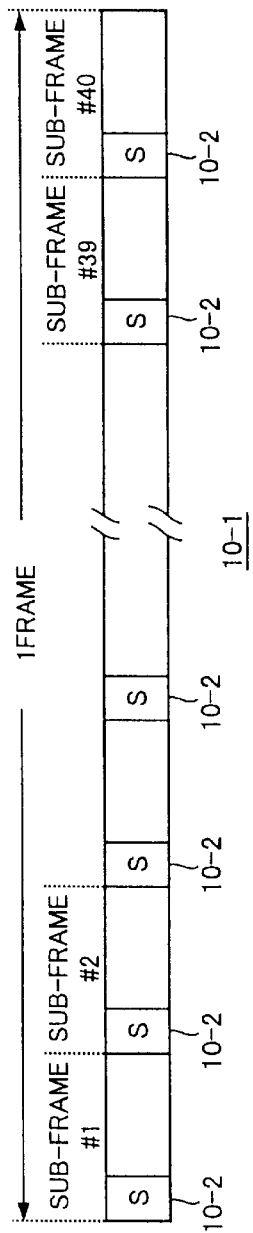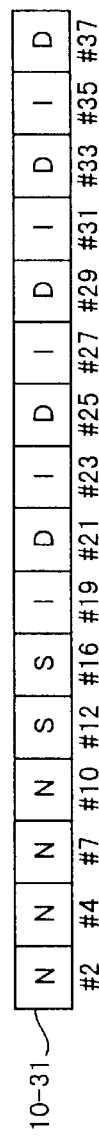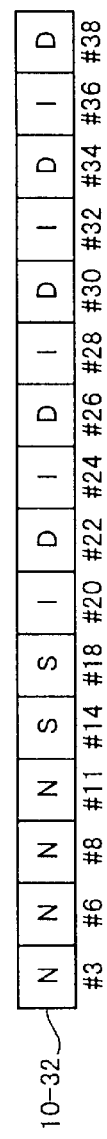
FIG.16A
FIG.16B
FIG.16C

FIG. 19

| Frame No. | TRACE-SIGNAL DATA ( J1 BYTE ) | | | | | | | |
|---|---|---|---|---|---|---|---|---|
| | MSB | 2 | 3 | 4 | 5 | 6 | 7 | LSB |
| 0 | $F_0$ | $C_1$ | $C_2$ | $C_3$ | $C_4$ | $C_5$ | $C_6$ | $C_7$ |
| 1 | $F_1$ | $X_{11}$ | $X_{12}$ | $X_{13}$ | $X_{14}$ | $X_{15}$ | $X_{16}$ | $X_{17}$ |
| ⁓ | ⁓ | ⁓ | ⁓ | ⁓ | ⁓ | ⁓ | ⁓ | ⁓ |
| 14 | $F_E$ | $X_{E1}$ | $X_{E2}$ | $X_{E3}$ | $X_{E4}$ | $X_{E5}$ | $X_{E6}$ | $X_{E7}$ |
| 15 | $F_F$ | $X_{F1}$ | $X_{F2}$ | $X_{F3}$ | $X_{F4}$ | $X_{F5}$ | $X_{F6}$ | $X_{F7}$ |

FIG.22A

| | | OUTPUT OF FIRST STUFF - CHEK UNIT | | |
|---|---|---|---|---|
| | | POSITIVE | NEGATIVE | NO OPERATION |
| OUTPUT OF MATCH - DETECTION UNIT | MATCH FOR J1 | NO OPERATION | NO OPERATION | NO OPERATION |
| | MATCH FOR J1 - p | POSITIVE | NO OPERATION | NO OPERATION |
| | MATCH FOR J1 - n | NO OPERATION | NEGATIVE | NO OPERATION |
| | NO MATCH OR MORE THAN ONE MATCH | POSITIVE | NEGATIVE | NO OPERATION |

FIG.22B

| | | OUTPUT OF FIRST STUFF - CHEK UNIT | | |
|---|---|---|---|---|
| | | POSITIVE | NEGATIVE | NO OPERATION |
| OUTPUT OF MATCH - DETECTION UNIT | MATCH FOR J1 | NO OPERATION | NO OPERATION | NO OPERATION |
| | MATCH FOR J1 - p | POSITIVE | POSITIVE | POSITIVE |
| | MATCH FOR J1 - n | NEGATIVE | NEGATIVE | NEGATIVE |
| | NO MATCH OR MORE THAN ONE MATCH | POSITIVE | NEGATIVE | NO OPERATION |

METHOD AND DEVICE FOR AVOIDING ERROR OF POINTER PROCESS IN SDH RADIO COMMUNICATION

BACKGROUND OF THE INVENTION

1. Field of the Invention

The present invention relates to a method of avoiding an error of a pointer process in an SDH (synchronous digital hierarchy) transfer system and to a SDH radio communication device.

In recent years, a number of SDH networks have been implemented based on optical fibers, and, also, use of SDH systems has been on increase in digital multiplex radio systems. Against this background, it is vital to provide for SDH radio devices in implementing an SDH network where these SDH radio devices are equipped with stable high-quality data-transfer functions complying with the SDH interface. Also, a configuration that insures no malfunction is expected.

2. Description of the Related Art

FIG. 1 is an illustrative drawing showing a configuration of radio devices complying with the SDH interface. The configuration includes a carrier device 16-1 of an SDH transfer system, radio devices 16-2 and 16-3 complying with the SDH interface, and a carrier device 16-4 of another SDH transfer system.

The carrier devices 16-1 and 16-4 are connected to the radio devices 16-2 and 16-3, respectively, via optical cables conveying optical signals or coaxial cables or the like for conveying electrical signals. The radio devices 16-2 and 16-3 are connected to each other by means of a radio communication line. In this radio communication line, a radio frame complementary overhead (RFCOH) is attached when transfer is engaged.

FIG. 2 is an illustrative drawing for explaining a main portion of the radio device complying with the SDH interface. FIG. 2 is used for explaining a main portion of the radio device 16-2 or 16-3.

The radio device in FIG. 2 includes a carrier-side SDH-physical-interface (SPI) unit 17-1, a carrier-side regenerator-section-overhead (RSOH) processing unit 17-2, a carrier-side multiplex-section-overhead (MSOH) processing unit 17-3, a carrier-side administrative-unit-pointer (AU pointer) processing unit 17-4, a radio-side administrative-unit-pointer (AU pointer) processing unit 17-5, a radio-side multiplex-section-overhead (MSOH) processing unit 17-6, a radio-side regenerator-section-overhead (RSOH) processing unit 17-7, a modem 17-8, and a radio-transmission/reception unit (TX/RX) 17-9. A carrier-side processing unit is designated as 17-10, and a radio-side processing unit is denoted as 17-11. Here, an antenna for radio transmission/reception is not shown-in the figure.

The carrier-side SDH-physical-interface unit 17-1 is an interface for exchanging optical/electrical signals with the carrier device 16-1 or 16-4. The carrier-side regenerator-section-overhead processing unit 17-2, the carrier-side multiplex-section-overhead processing unit 17-3, and the carrier-side administrative-unit-pointer processing unit 17-4 are used for exchanging data with the carrier device of the SDH transfer system by using a STM-1 frame format, for example.

The SDH transfer system transfers digital signals by use of a standard STM (synchronous transfer mode) frame format. In this case, the STM-1 frame format (155 Mbps), for example, includes a section overhead (SOH) having 9 rows each comprised of 9 bites and a payload having 9 rows each comprised of 261 bytes.

FIG. 3 is an illustrative drawing showing a STM-1 frame format. A section overhead (SOH) 18-1 includes frame-synchronization bytes A1 and A2, an STM-frame-identification byte J0, error monitoring bytes B1 and B2, maintenance-personnel-voice-talk bytes E1 and E2, a user-channel byte F1, data-communication-channel bytes D1 through D12, pointer bytes H1 and H2, stuff-operation bytes H3, a switch-control byte K1, a section-warning-display byte K2, a synchronization-clock-quality byte S1, and a error-notification byte M1. A regenerator-section overhead is denoted as RSOH, and a multiplex-section overhead is denoted as MSOH. Further, a portion which stores bytes H1, H2, and H3 is referred to as an AU-pointer portion.

FIGS. 4A and 4B are illustrative drawings for explaining the pointer bytes H1 and H2, respectively. The pointer bytes H1 and H2 include 4 bits of new-data flags (NDF) N, SS bits, and a 10-bit pointer comprised of bits I and D.

The 4-bit new-data flags N are used for transferring an NDFEN signal (e.g., 1001) indicative of a change in a pointer value or an NORNDF signal (e.g., 0110) indicative of no change in the pointer value.

The 2-bit SS bits are used for detecting an invalid pointer. In detail, a set value or a fixed value is sent from a transmitter side, and a receiver side compares received SS bits with the set value or the fixed value in order to detect an invalid pointer.

The 10-bit pointer containing a pointer value is comprised of 5 bits of bit I and 5 bits of bit D arranged in turn at every other position, and is used for indicating a start position of multiplexed data in the payload as well as for controlling stuff operations.

The payload 18-2 comprised of 9 rows of 261 bytes stores data starting from a selected one of positions provided at 3-byte intervals. A position of the first data (J1 bytes) in the payload is represented by the 10-bit pointer indicative of one of 0 through 782.

The 10-bit pointer included in the pointer bytes H1 and H2 indicates the position of the first data in the payload, and, also, is used for controlling stuff operations. The stuff operations include a positive stuff operation inserting 3-byte stuff bytes into the payload and a negative stuff operation relocating 3-byte data from the payload to the stuff-operation bytes H3#1 through H3#3 in the AU-pointer portion.

The 5 bits I in the 10-bit pointer are used when the positive stuff operation is performed. In the case of the positive stuff operation, the transmitter side obtains an inverse of each of 5 bits I of a preceding frame, and sends each of the obtained inverses as a bit I. By doing so, the transmitter side indicates an increment by 3 bytes of the position of the first data in the payload, and inserts 3 stuff bytes into the payload before transmitting an STM-1 frame signal.

The 5 bits D in the 10-bit pointer are used when the negative stuff operation is performed. In the case of the negative stuff operation, the transmitter side obtains an inverse of each of 5 bits D of a preceding frame, and sends each of the obtained inverses as a bit D. By doing so, the transmitter side indicates a decrement by 3 bytes of the position of the first data in the payload, and relocates 3-byte data from the payload to the stuff-operation bytes H3#1 through H3#3 in the AU-pointer unit before transmitting an STM-1 frame signal.

The receiver side checks the pointer bytes H1 and H2, and accept them as a correct pointer indicative of the position of the first data in the payload if the pointer value represented by the 10 bits is identical in more than two consecutive frames. Because of this, even when bits I and bits D of the 10-bit pointer are used for the stuff operations, the pointer value can never be misidentified as indicating a wrong position of the first data in the payload.

Further, if no less than 3 bits I out of the total of 5 bits I are an inverse of respective bits I of the preceding frame and if no more than 2 bits D out of the total of 5 bits D are an inverse of respective bits D of the preceding frame, a determination is made that a positive stuff operation has been conducted. In this case, processing of the received payload data is carried out such that the stuff bytes inserted on the transmitter side are not read on the receiver side.

Further, if no less than 3 bits D out of the total of 5 bits D are an inverse of respective bits D of the preceding frame and if no more than 2 bits I out of the total of 5 bits I are an inverse of respective bits I of the preceding frame, a determination is made that a negative stuff operation has been conducted. In this case, the receiver side reads data from the stuff-operation bytes H3#1 through H3#3 in the AU-pointer portion as well as the payload data, and processes the data.

As described above, the pointer bytes H1 and H2 indicate a start position of the multiplex data in the payload, and, also, indicates presence/absence of a stuff operation through inverting of bits in the pointer. As shown in the STM-1 frame format of FIG. 3, the pointer bytes H1 and H2 are arranged next to each other in a concentrated manner in the section overhead (SOH) 18-1. Because of this arrangement, when a transfer error of a burst type is generated with respect to the pointer bytes H1 and H2, the pointer value will be misidentified, and the start position of the multiplex data in the payload cannot be correctly identified. Namely, an erroneous pointer process may be performed.

FIGS. 5A and 5B are illustrative drawings for explaining a burst error which will affects a pointer process. FIG. 5A shows a case in which a burst error occurs in the payload and the pointer byte H1#1. FIG. 5B shows a case in which a burst error is generated in the section overhead SOH including the pointer bytes H1#1.

As shown in FIGS. 5A and 5B, if a burst error hits the new-data flags N and the bits I and D constituting a 10-bit pointer, the receiver side may receive the NDFEN (NDF enable) signal (e.g., 1001) indicative of a change in the pointer value, and may mistakenly update the pointer value based on the false 4 indication of the change.

FIGS. 6A and 6B are illustrative drawings for explaining a burst error which will affect a stuff operation. FIG. 6A shows a case in which a burst error hits among other portions a portion including at least three bits I of the bits I and D of the 10-bit pointer. FIG. 6B demonstrates a case in which a burst error is generated with respect to a portion including at least three bits D in addition to other portions.

If a burst error damages at least 3 bits I or at least 3 bits D, the receiver side ascertains that conditions indicating a proper stuff operation are satisfied, and mistakenly attends to a stuff operation.

A transfer error of a burst type is likely to occur in radio communication lines where so-called phasing or the like is brought about as a irregular communication fault when radio waves interfere with each other because of reflections and diffractions and suffer a severe attenuation in magnitude. Once such a transfer error of a burst type develops, dozens of consecutive bits are damaged by the error. If the transfer error of a burst type develops in the pointer bytes H1 and H2 which are closely arranged, the pointer value may be misidentified, and the pointer process and the stuff operation on the receiver side may not be properly conducted.

The STM-1 frame format is defined by ITU-T (international telecommunication union telecommunication standardization sector), so that no arbitrary change can be made thereto. Further, there is no guarantee that the carrier device 16-1 and the radio device 16-2 used for implementing the network are manufactured as one set of devices. Because of this, an arrangement of the AU-pointer portion attended to by the carrier-side administrative-unit-pointer processing unit 17-4 (FIG. 2) needs to be in compliance with the standard format as stipulated in ITU-T.

A format used in the radio section between the radio devices 16-2 and 16-3 may be in accordance with the SDH format. In this case, as noted previously, the radio-frame-complementary overhead RFCOH may be attached. Fortunately, the SDH format contains unused bytes.

Accordingly, there is a need for a scheme which can reduce a likelihood of an erroneous pointer process caused by a transfer error of a burst type by use of unused or undefined bytes of the section overhead SOH in the radio-frame-complementary overhead or the SDH format.

SUMMARY OF THE INVENTION

Accordingly, it is a general object of the present invention to provide a device and a method which can satisfy the need described above.

It is another and more specific object of the present invention to provide a device and a method which can reduce a likelihood of an erroneous pointer process caused by a transfer error of a burst type by use of unused or undefined bytes of the section overhead SOH in the radio-frame-complementary overhead or the SDH format.

In order to achieve the above objects according to the present invention, a method of preventing an error of a pointer process in an SDH radio device which receives an STM frame having a section overhead and a payload therein includes the steps of distributing a pointer to unused bytes or undefined bytes in the section overhead of the STM frame, the pointer indicating a start position of multiplex data in the payload of the STM frame, and transmitting the STM frame to the SDH radio device.

In the method described above, a pointer as originally included in the STM frame can be reconstructed on the receiver side by extracting the distributed pointer from the STM frame. Because of the distributed arrangement of the pointer, a likelihood of an error of a pointer process can be reduced when a burst error is generated.

According to another aspect of the present invention, a method of preventing an error of a pointer process in an SDH radio device which receives an STM frame having a section overhead and a payload therein along with radio-frame-complementary overheads attached to the STM frame includes the steps of distributing a pointer in the radio-frame-complementary overheads attached to the STM frame, the pointer indicating a start position of multiplex data in the payload of the STM frame, and transmitting the STM frame to the SDH radio device.

In the method described above, the pointer is distributed in the radio-frame-complementary overheads, which are used only for a radio-communication section. Because of the distributed arrangement of the pointer, the pointer can be reconstructed even when a burst error occurs, thereby reducing a likelihood of an error of a pointer process.

According to another aspect of the present invention, a method of preventing an error of a pointer process in an SDH radio device which receives an STM frame having a section overhead and a payload therein includes the steps of generating stuff-check bits indicative of a type of a stuff operation based on a pointer indicating a start position of multiplex data in the payload of the STM frame, distributing the stuff-check bits to unused bytes or undefined bytes in the section overhead of the STM frame in addition to allocating the pointer to a standard position thereof in the section overhead of the STM frame, and transmitting the STM frame to the SDH radio device.

In the method described above, the stuff-check bits-can be reconstructed even when a burst error occurs, thereby reducing a likelihood of an error of a pointer process including a stuff process.

According to another aspect of the present invention, a method of preventing an error of a pointer process in an SDH radio device which receives an STM frame having a section overhead and a payload therein along with radio-frame-complementary overheads attached to the STM frame includes the steps of generating stuff-check bits indicative of a type of a stuff operation based on a pointer indicating a start position of multiplex data in the payload of the STM frame, distributing the stuff-check bits to the radio-frame-complementary overheads attached to the STM frame in addition to allocating the pointer to a standard position thereof in the section overhead of the STM frame, and transmitting the STM frame to the SDH radio device.

In the method described above, the stuff-check bits can be reconstructed even when a burst error occurs, thereby reducing a likelihood of an error of a pointer process including a stuff process.

According to another aspect of the present invention, a method of preventing an error of a pointer process in an SDH radio device which receives an STM frame having a section overhead and a payload therein along with radio-frame-complementary overheads attached to the STM frame includes the steps of distributing a plurality of pointers in the radio-frame-complementary overheads attached to the STM frame in addition to allocating a pointer in the section overhead of the STM frame, the pointers being identical to the pointer which indicates a start position of multiplex data in the payload of the STM frame, transmitting the STM frame to the SDH radio device, and taking a majority vote among the plurality of pointers and the pointer on a side of the SDH radio device.

In the method described above, a correct pointer can be identified by the majority vote even when a burst error occurs, thereby reducing a likelihood of an error of a pointer process.

According to another aspect of the present invention, a method of preventing an error of a pointer process in an SDH radio device which receives an STM frame having a section overhead and a payload therein includes the steps of receiving a pointer indicative of a start position of multiplex data in the payload of the STM frame and indicative of a type of a stuff operation, the start position depending on the type of a stuff operation, making a first check regarding the type of a stuff operation based on the pointer, making a comparison of a set of data extracted from the payload at the start position of multiplex data over a predetermined number of STM frames with a predetermined set of expected data, the comparison being made with respect to each of different start positions corresponding to different types of stuff operations, and making a second check to identify the type of the stuff operation based on the first check and the comparison.

In the method described above, protection against an error in a stuff check can be provided, thereby reducing a likelihood of an error of a pointer process including a stuff process when a burst error is generated.

Each of the methods described above can be implemented by a respective device as shown in the following.

According to one aspect of the present invention, a device for conducting radio communication based on an SDH system by exchanging an STM frame having a section overhead and a payload therein includes a pointer-arrangement-conversion unit which arranges each bit of a pointer in such an arrangement as to correspond to unused bytes or undefined bytes in the section overhead of the STM frame, the pointer indicating a start position of multiplex data in the payload of the STM frame, a frame-memory unit which accumulates at least one STM frame's worth of data, and a pointer-multiplex unit which multiplexes the pointer to the STM frame supplied from the frame-memory unit so as to distribute the pointer to the unused bytes or undefined bytes in the section overhead of the STM frame.

According to another aspect of the present invention, a device for conducting radio communication based on an SDH system by exchanging an STM frame having a section overhead and a payload therein includes a radio-frame-complementary-overhead-multiplex unit which attaches radio-frame-complementary overheads to the STM frame, a pointer-demultiplex unit which extracts from the STM frame a pointer indicative of a start position of multiplex data in the payload of the STM frame, and a pointer-multiplex unit which distributes the pointer extracted by the pointer-demultiplex unit to the radio-frame-complementary overheads attached to the STM frame by the radio-frame-complementary-overhead-multiplex unit.

According to another aspect of the present invention, a device for conducting radio communication based on an SDH system by exchanging an STM frame having a section overhead and a payload therein includes a stuff processing unit which performs a stuff operation, and generates stuff-check bits corresponding to the stuff operation based on a pointer indicative of a start position of multiplex data in the payload of the STM frame, and a stuff-check-bit-multiplex unit which distributes the stuff-check bits to unused bytes or undefined bytes in the section overhead of the STM frame, wherein the pointer is allocated to a standard position thereof in the section overhead of the STM frame.

According to another aspect of the present invention, a device for conducting radio communication based on an SDH system by exchanging an STM frame include a stuff-information-extraction unit which extracts stuff-check bits corresponding to a stuff operation from the STM frame, a radio-frame-complementary-overhead-multiplex unit which attaches radio-frame-complementary overheads to the STM frame, and a stuff-check-bit-multiplex unit which distributes the stuff-check bits extracted by the stuff-information-extraction unit to the radio-frame-complementary overheads attached to the STM frame by the radio-frame-complementary-overhead-multiplex unit.

According to another aspect of the present invention, a device for conducting radio communication based on an SDH system by exchanging an STM frame having a section overhead and a payload therein includes a pointer-demultiplex unit which extracts from the STM frame a pointer indicative of a start position of multiplex data in the payload of the STM frame, a radio-frame-complementary-overhead-multiplex unit which attaches radio-frame-complementary overheads to the STM frame, a pointer-multiplex unit which allocates a plurality of pointers to the radio-frame-complementary overheads attached to the STM frame by the radio-frame-complementary-overhead-multiplex unit, the plurality of pointers identical to the pointer, a receiver-side pointer-demultiplex unit which extracts the plurality of pointers from received radio-frame-complementary overheads sent from another device for conducting radio communication, a pointer-byte-demultiplex unit which extracts the pointer from a received STM frame sent from the another device, and a pointer-byte-majority-vote unit which takes a majority vote among the plurality of pointers extracted from the received radio-frame-complementary overheads and the pointer extracted form the received STM frame.

According to another aspect of the present invention, a device for conducting radio communication based on an SDH system by exchanging an STM frame having a section overhead and a payload therein includes a pointer-demultiplex unit which extracts a pointer indicative of a start position of multiplex data in the payload of the STM frame and indicative of a type of a stuff operation, the start position depending on the type of a stuff operation, a first stuff-check unit which makes a first check regarding the type of a stuff operation based on the pointer, a comparison unit which makes a comparison of a set of data extracted from the payload at the start position of multiplex data over a predetermined number of STM frames with a predetermined set of expected data, the comparison being made with respect to each of different start positions corresponding to different types of stuff operations, and a second-check unit which makes a second check to identify the type of the stuff operation based on the first check and the comparison.

Other objects and further features of the present invention will be apparent from the following detailed description when read in conjunction with the accompanying drawings.

BRIEF DESCRIPTION OF THE DRAWINGS

FIGS. 10A and 10B are block diagrams showing a configuration of a radio-side AU-pointer processing unit according to the second embodiment of the present invention;

FIGS. 13A and 13B are illustrative drawings showing an arrangement of stuff-check bits according to a fourth embodiment of the present invention;

FIGS. 16A through 16C are illustrative drawings showing an arrangement of a plurality of pointers according to the fifth embodiment of the present invention

FIG. 19 is an illustrative drawing showing a frame format of a trace signal;

FIGS. 22A and 22B are table charts showing how a positive/negative stuff operation is identified.

DESCRIPTION OF THE PREFERRED EMBODIMENTS

In the following, embodiments of the present invention will be described with reference to the accompanying drawings.

Figures 7A, 7B:
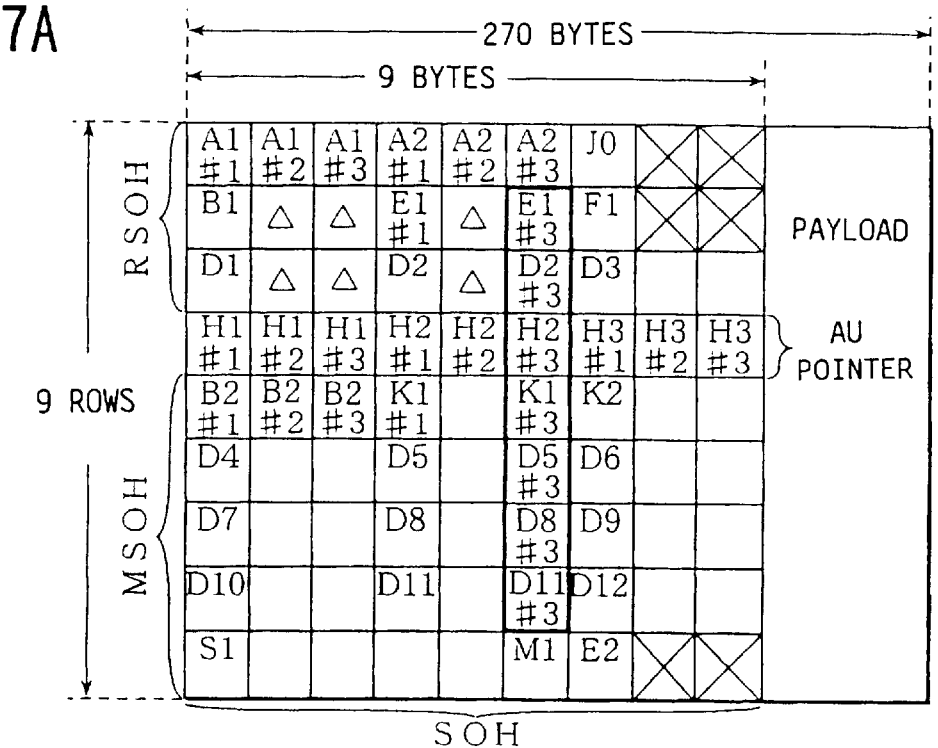
FIGS. 7A and 7B are illustrative drawings showing a pointer arrangement according to a first embodiment of the present invention.

FIGS. 7A and 7B are illustrative drawings showing a pointer arrangement according to a first embodiment of the present invention.

FIG. 7A shows an STM-1 frame format. Unused or undefined bytes in the section overhead (SOH) of the STM-1 frame are used for allocating the pointer bytes H1, H2, and H3 in a distributed manner. These unused or undefined bytes are E1#3, D2#3, H2#3, K1#3, D5#3, D8#3, and D11#3.

FIG. 7B shows a bit arrangement of the pointer allocated to the above-identified bytes E1#3, D2#3, H2#3, K1#3, D5#3, D8#3, and D11#3. As shown in the figure, the new-data flags (NNNN), the SS bits (SS), the pointer bits (IDIDIDIDID) are distributed inside the bytes E1#3, D2#3, H2#3, K1#3, D5#3, D8#3, and D11#3. For example, the first and third bits of the bytes E1#3 and D2#3 are assigned to the new-data flag bits, and the fifth bits of the bytes E1#3 and D2#3 are used for the SS bits. Further, the first bits of the bytes H2#3, K1#3, D5#3, D8#3, and D11#3 are used for I bits, and the fifth bits thereof are assigned to D bits.

In this manner, the pointer bytes are distributed (spread) in the frame while the standard format of the STM-1 frame is maintained, and individual bits of the pointer are also distributed (spread) within the pointer bytes. Because of this arrangement, a burst error, if generated, can damage only a few bits of the pointer bytes. This arrangement, therefore, can reduce a likelihood of an error of a pointer process caused by an erroneous pointer value. The pointer bits in a distributed arrangement can be extracted on the receiver side to reconstruct the pointer bytes, and the reconstructed pointer bytes can then be compared with the pointer bytes H1 through H3 in the AU-pointer portion of the section overhead, thereby effecting an error check. The unused or undefined bytes used for the distributed arrangement in the above description are only an example, and other unused or undefined bytes may be used for the same purpose. Further, the same principle can be extended to STM-n frames (n=4, 16, . . . ) in addition to the STM-1 frame.

Figure 8:
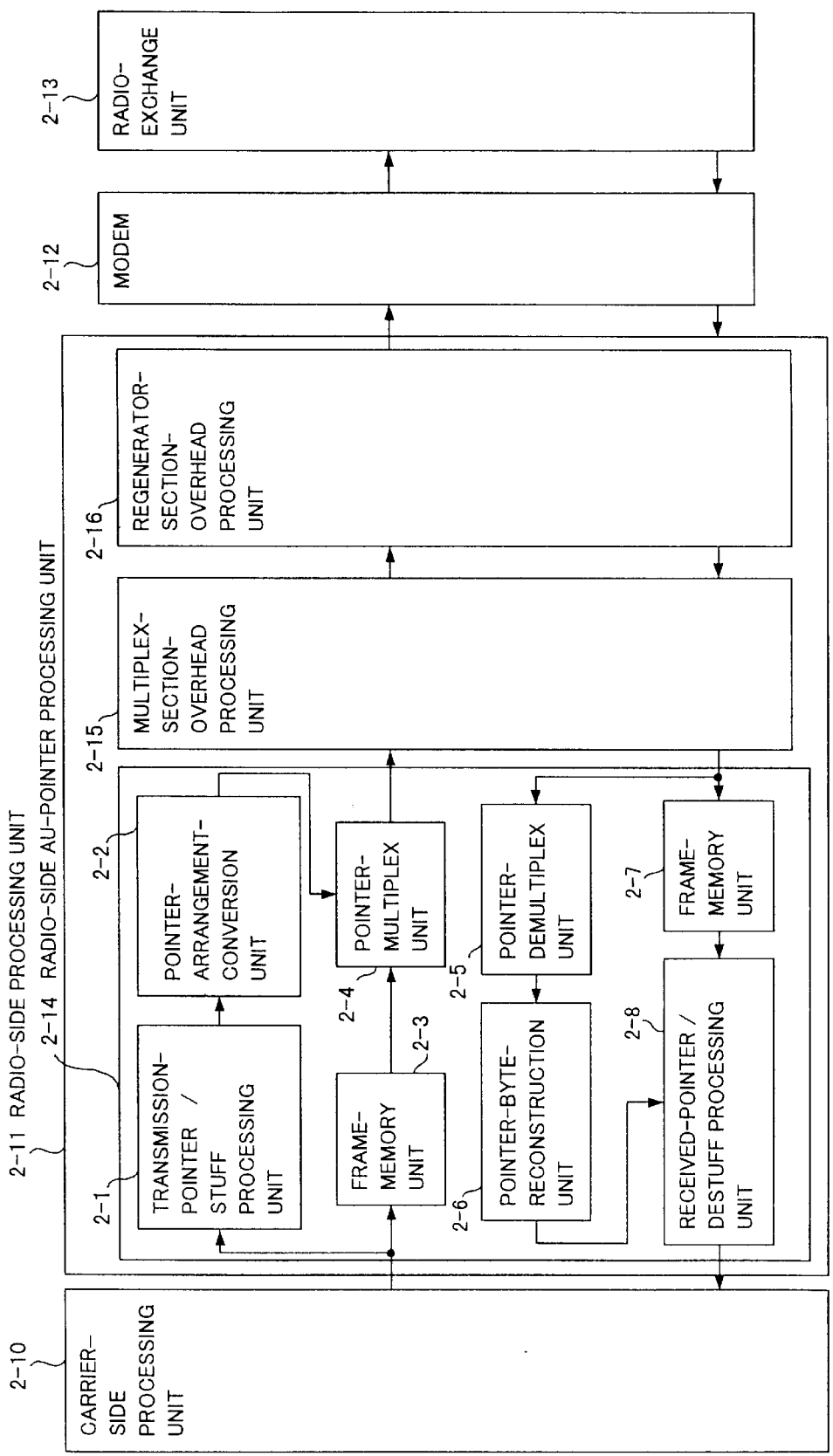
FIG. 8 is a block diagram showing a main configuration of an SDH radio device according to a first embodiment of the present invention.

FIG. 8 is a block diagram showing a main configuration of an SDH radio device according to the first embodiment of the present invention.

The SDH radio device of FIG. 8 includes a transmission-pointer/stuff processing unit 2-1, a pointer-arrangement-conversion unit 2-2, a frame-memory unit 2-3, a pointer-multiplex unit 2-4, a pointer-demultiplex unit 2-5, a pointer-byte-reconstruction unit 2-6, a frame-memory unit 2-7, a received-pointer/destuff processing unit 2-8, a carrier-side processing unit 2-10, a radio-side processing unit 211, a modem 2-12, a radio-exchange unit 2-13, a radio-side AU-pointer processing unit 2-14, a radio-side multiplex-section-overhead (MSOH) processing unit 2-15, a radio-side regenerator-section-overhead (RSOH) processing unit 2-16.

Figure 1:
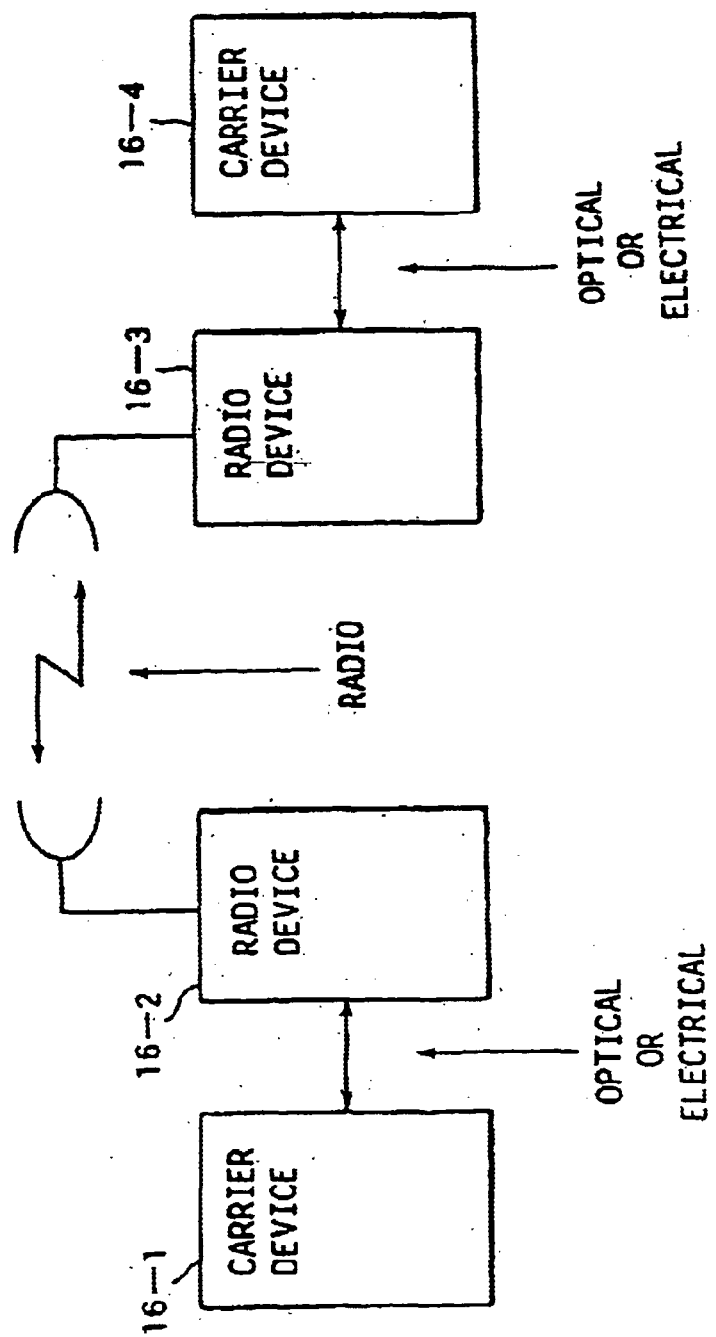
FIG. 1 is an illustrative drawing showing a configuration of radio devices complying with an SDH interface.
Figure 2:
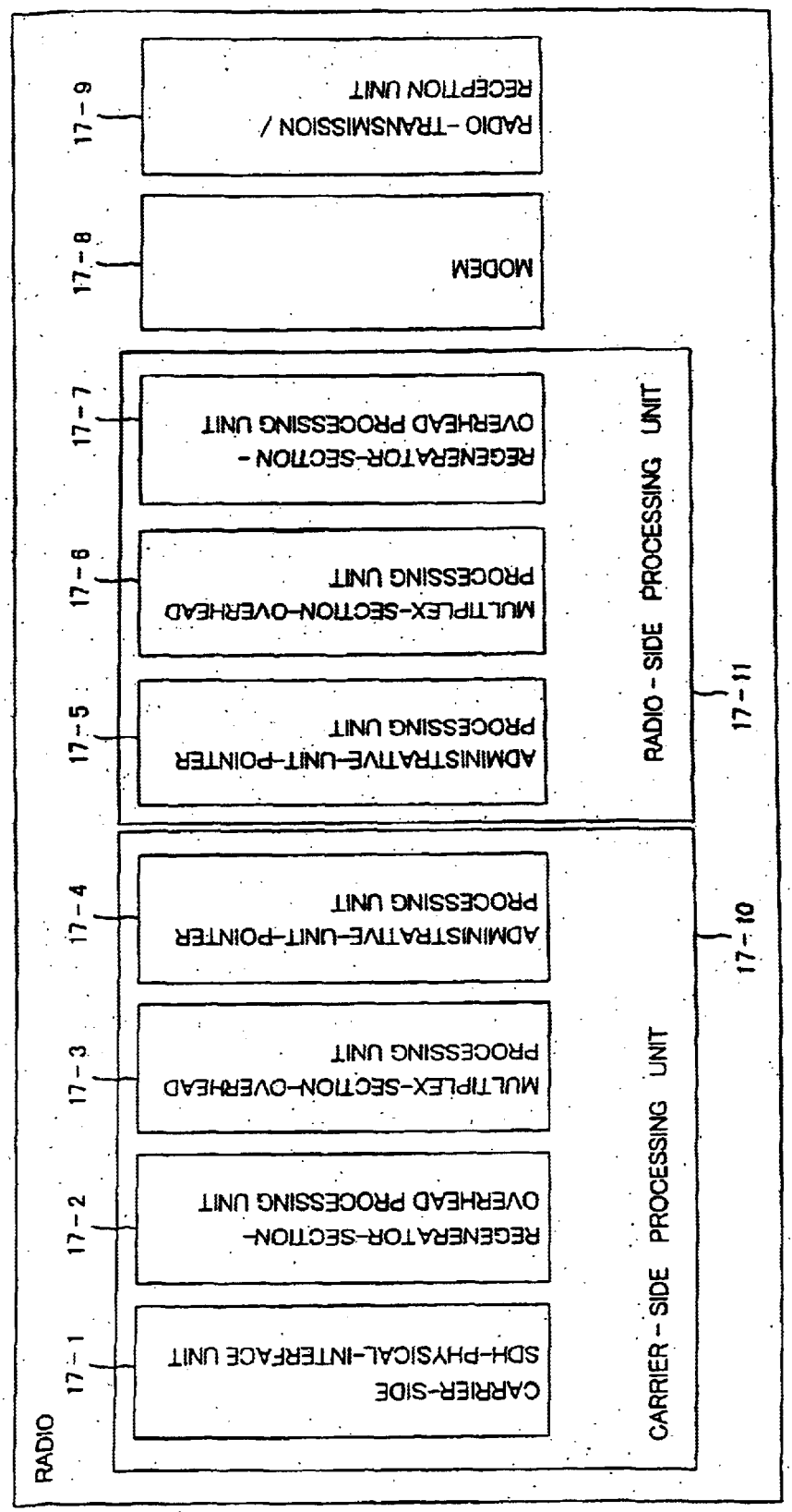
FIG. 2 is an illustrative drawing for explaining a main portion of a radio device complying with the SDH interface.
Figure 3:
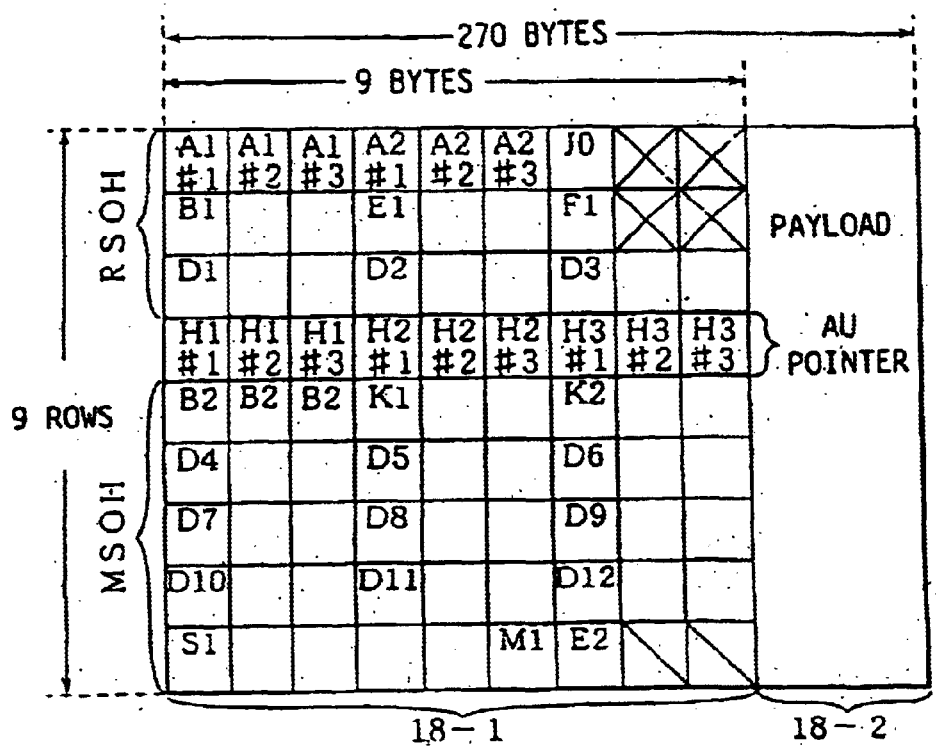
FIG. 3 is an illustrative drawing showing an STM-1 frame format.
Figure 4A:
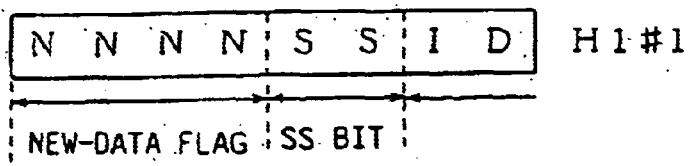
FIGS. 4A and 4B are illustrative drawings for explaining pointer bytes H1 and H2, respectively.
Figure 4B:
Figures 5A, 5B:
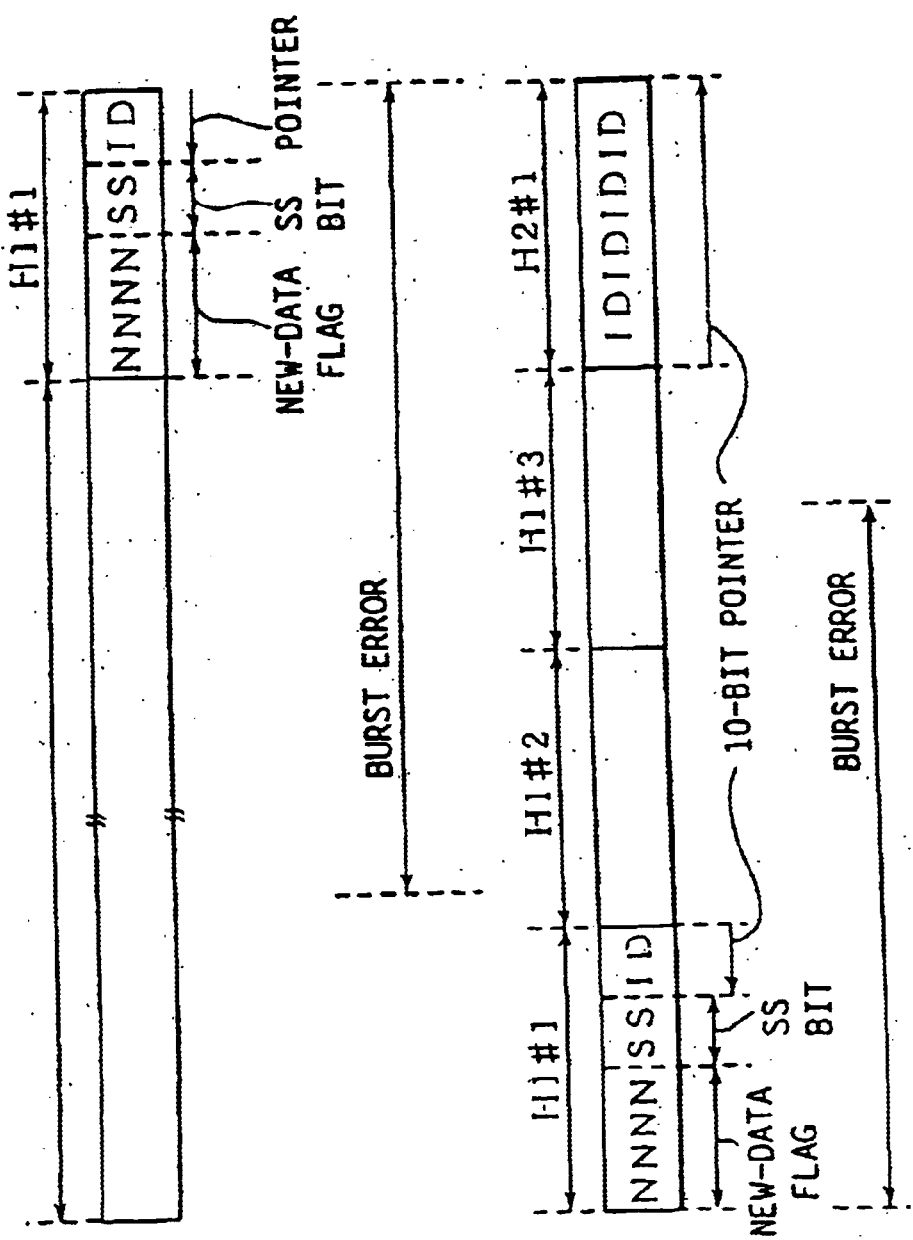
FIGS. 5A and 5B are illustrative drawings for explaining a burst error which will affects a pointer process.
Figures 6A, 6B:
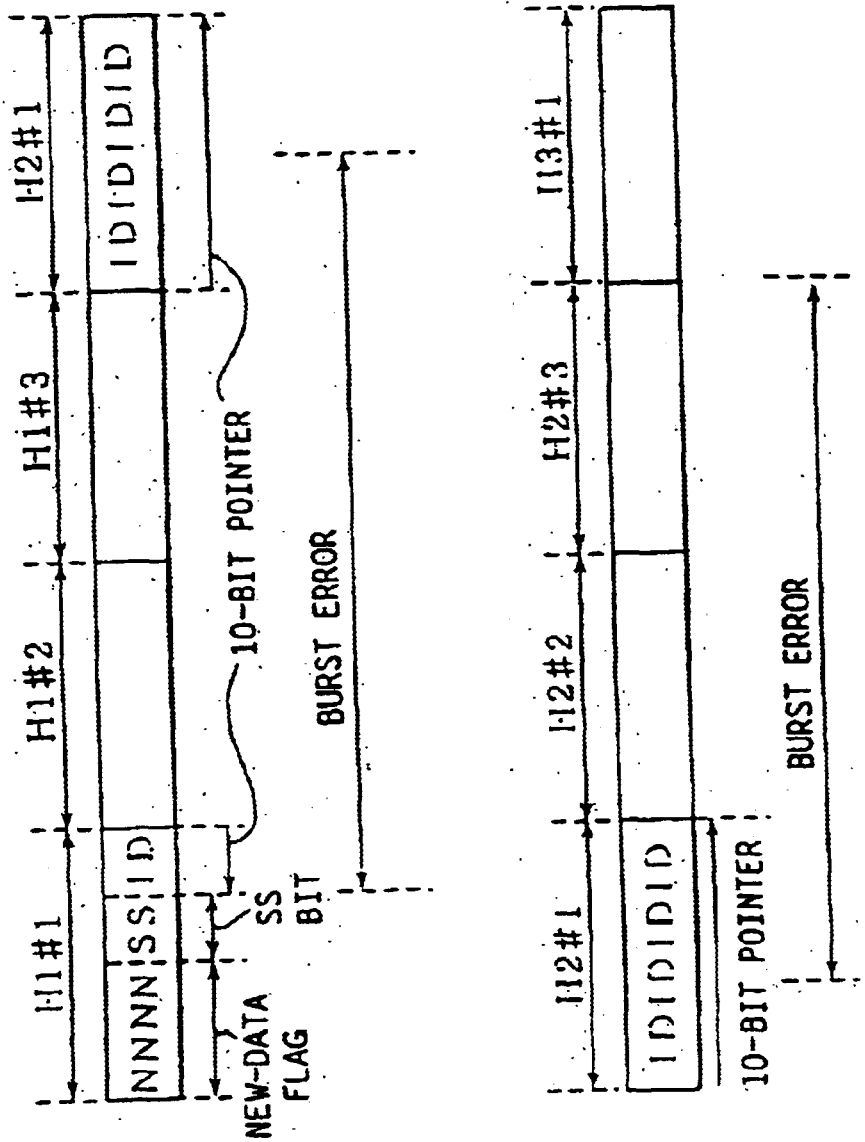
FIGS. 6A and 6B are illustrative drawings for explaining a burst error which will affect a stuff operation.

The carrier-side processing unit 2-10, the modem 2-12, the radio-exchange unit 2-13, and the multiplex-section-overhead processing unit 2-15 and the regenerator-section-overhead processing unit 2-16 of the radio-side processing unit 2-11 may have the same respective configurations as the carrier-side processing unit 17-10, the modem 17-8, the radio-transmission/reception unit 17-9, and the multiplex-section-overhead processing unit 17-6 and the regenerator-section-overhead processing unit 17-7 of the radio-side processing unit 17-11 of FIG. 2, respectively.

In this embodiment, the radio-side AU-pointer processing unit 2-14 distributes individual bits of a pointer in terms of an arrangement thereof by allocating them to unused or undefined bytes in the section overhead, and, also, reconstructs a pointer when receiving a frame.

The transmission-pointer/stuff processing unit 2-1 applies a pointer process and a stuff process basically identical to those of the related art to an STM-1 signal supplied from the carrier-side processing unit 2-10, and outputs an obtained pointer value to be transmitted to the pointer-arrangement-conversion unit 2-2. The pointer-arrangement-conversion unit 2-2 supplies each byte of the pointer of the received STM-1 signal to the pointer-multiplex unit 2-4 such that the bytes of the pointer are distributed and allocated to the bytes E1#3, D2#3, H2#3, K1#3, D5#3, D8#3, and D11#3 of the section overhead (SOH), for example, as shown in FIGS. 7A and 7B.

The frame-memory unit 2-3 accumulates the STM-1 signal input thereto for one frame's worth of data, and outputs the accumulated data to the pointer-multiplex unit 2-4. The pointer-multiplex unit 2-4 multiplexes the pointer-bit signal from the pointer-arrangement-conversion unit 2-2 to the output of the frame-memory unit 2-3, and supplies the STM-1 signal with the unused or undefined bytes thereof in the section overhead SOH accommodating the pointer.

On the receiver side, an STM-1 signal received via the regenerator-section-overhead processing unit 2-16 and the multiplex-section-overhead processing unit 2-15 is accumulated for one frame's worth of data in the frame-memory unit 2-7. Also, the received STM-1 signal is supplied to the pointer-demultiplex unit 2-5, where the distributed pointer in the section overhead SOH is extracted and supplied to the pointer-byte-reconstruction unit 2-6. The pointer-byte-reconstruction unit 2-6 reconstructs the pointer byte from the pointer bits supplied from the pointer-demultiplex unit 2-5.

An output of the pointer-byte-reconstruction unit 2-6 and an output of the frame-memory unit 2-7 are supplied to the received-pointer/destuff processing unit 2-8, where the pointer process and the destuff process identical to those of the related art are applied to the reconstructed pointer bytes. Further, the received-pointer/destuff processing unit 2-8 obtains a pointer value from the pointer bytes, and identifies a start position of multiplex data contained in the payload of the STM-1 signal when the STM-1 signal is supplied from the frame-memory unit 2-7. Processes after the reconstruction of the pointer bytes are the same as those of the related art.

Figure 9:
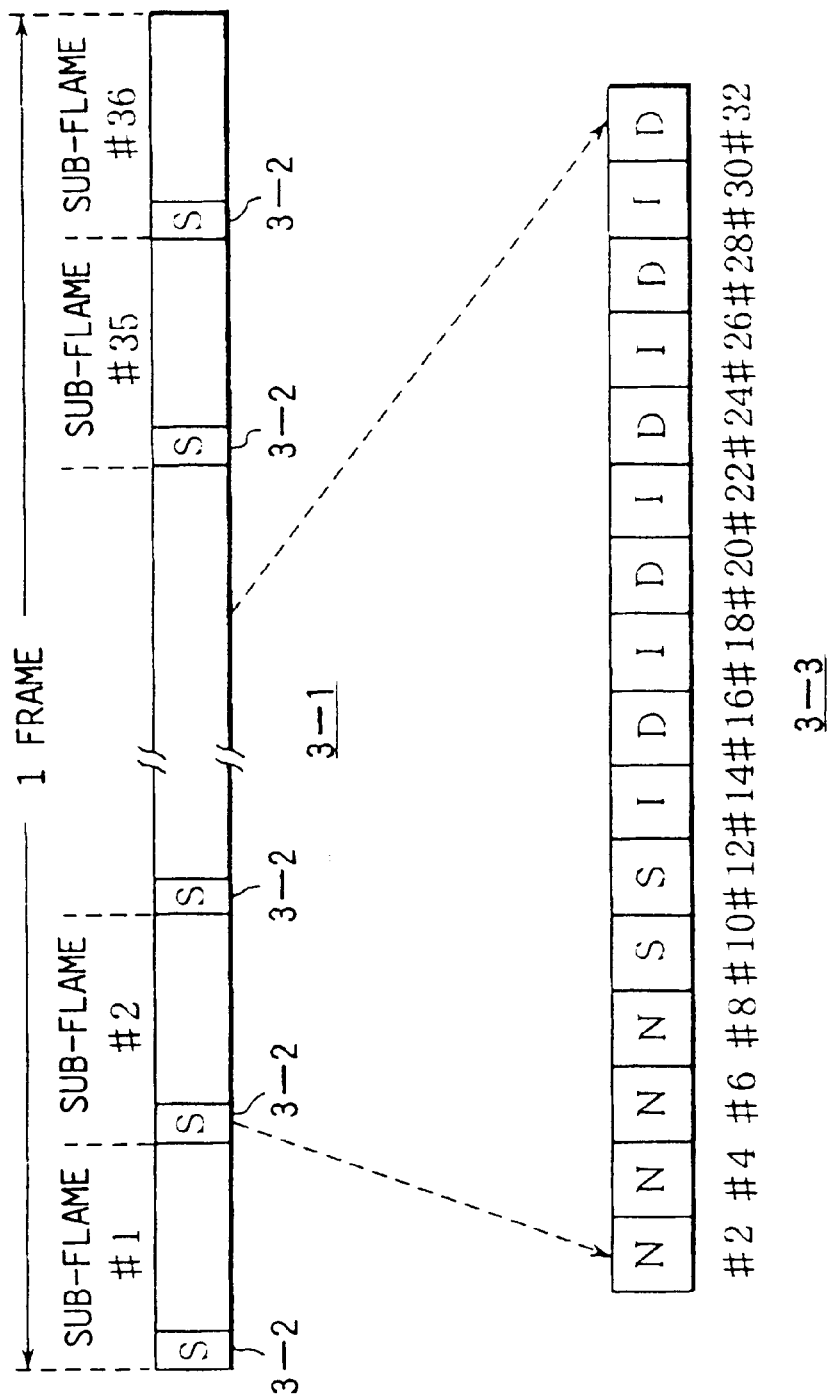
FIG. 9 is an illustrative drawing showing a pointer arrangement according to a second embodiment of the present invention.

FIG. 9 is an illustrative drawing showing a pointer arrangement according to a second embodiment of the present invention.

In FIG. 9, a radio-transfer frame 3-1 is the STM-1 frame described above plus radio-frame-complementary overheads 3-2, which are radio transfer overheads. A pointer 3-3 is distributed in the radio-frame-complementary overheads 3-2.

The radio-transfer frame 3-1 is divided into a plurality of sub-frames, each of which is accompanied by a radio-frame-complementary overhead (S) 3-2. The radio-frame-complementary overhead 3-2 of each sub-frame has a bit assigned thereto. For example, frame-synchronization bits may be assigned to the 1st, 5th, 9th, 13th, and 17th sub-frames, and the pointer 3-3 may be assigned to the 2nd, 4th, 6th, 8th, 10th, 12th, 14th, 16th, 18th, 20th, 22nd, 24th, 26th, 28th, 30th, and 32nd. Further, digital service channels may be allocated to the 3rd, 7th, 11th, 15th, 19th, 23rd, 27th, 31st, and 35th.

The pointer 3-3 arranged in this manner ends up being distributed within the radio-transfer frame 31. This reduces an adverse effect of a burst error, and lessens a likelihood of an error of a pointer process.

Figure 10B:
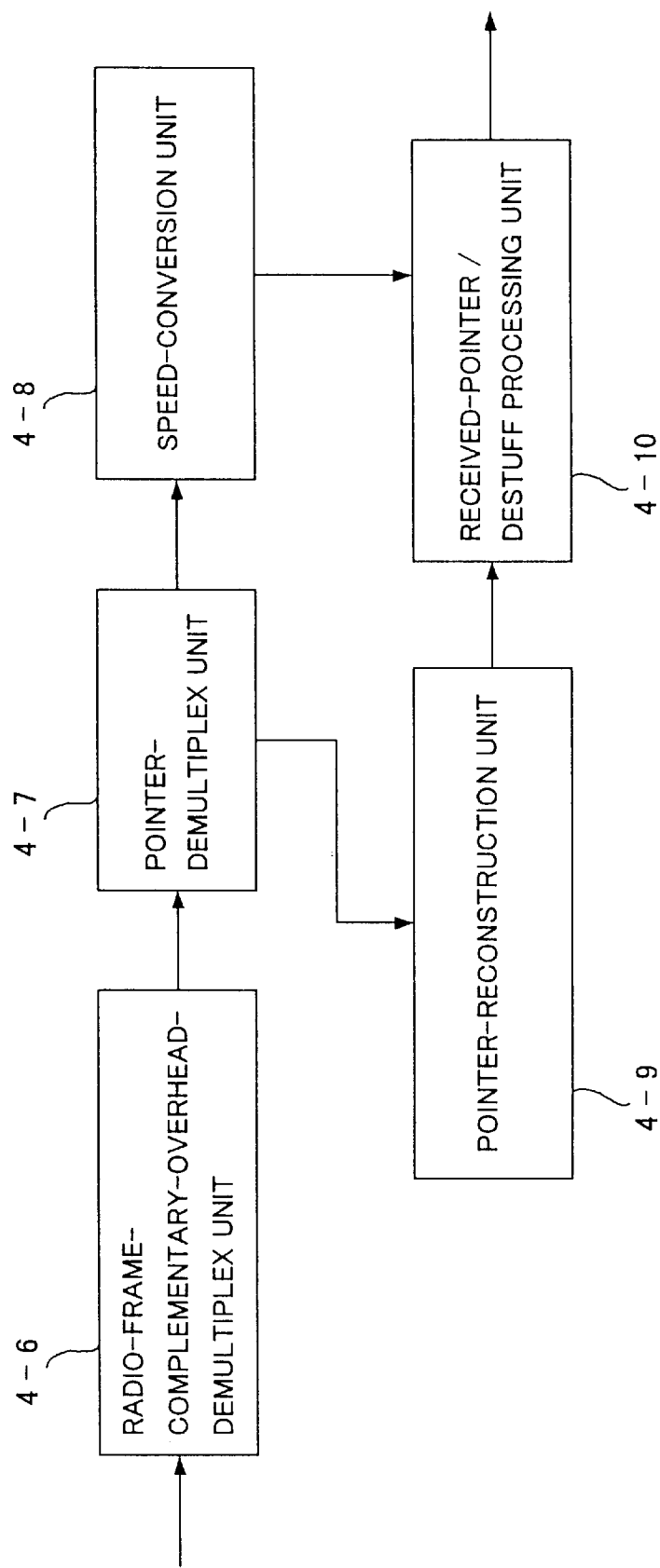

FIGS. 10A and 10B are block diagrams showing a configuration of the radio-side AU-pointer processing unit according to the second embodiment of the present invention. These figures show portions corresponding to the radio-side AU-pointer processing unit 2-14, and other portions of the radio device are omitted.

FIG. 10A shows a configuration on the transmitter side. This configuration includes a transmission-pointer/stuff processing unit 4-1, a speed-conversion unit 4-2 for converting a speed to that of radio-transfer, a radio-frame-complementary-overhead-multiplex unit 4-3, a pointer-demultiplex unit 4-4, and a pointer-multiplex unit 4-5.

FIG. 10B shows a configuration on the receiver side. This configuration includes a radio-frame-complementary-overhead-demultiplex unit 4-6, a pointer-demultiplex unit 4-7, a speed-conversion unit 4-8 for converting a transfer speed from that of the radio transfer to that of the STM-1 transfer, a pointer-reconstruction unit 4-9, and a received-pointer/destuff processing unit 4-10.

In FIG. 10A, the transmission-pointer/stuff processing unit 4-1 receives an STM-1 signal from the carrier-side processing unit (not shown), and applies a conventional pointer process and a conventional stuff process to the STM-1 signal. The speed-conversion unit 4-2 converts the STM-1 signal frame by frame so as to comply with the speed of radio transfer. The radio-frame-complementary-overhead-multiplex unit 4-3 attaches radio-frame-complementary overheads (RFCOH) (i.e., radio-transfer overheads) to the speed-converted STM-1 signal.

The pointer-demultiplex unit 4-4 extracts pointer bytes from the STM-1 signal, and supplies the pointer bytes to the pointer-multiplex unit 4-5. The pointer-multiplex unit 4-5 distributes each bit of the pointer bytes to a respective pointer-bit position of the radio-frame-complementary overheads as shown in FIG. 9. The STM-1 frame having the radio-frame-complementary overheads attached thereto is transmitted from the radio-exchange unit (not shown).

On the receiver side shown in FIG. 10B, the radio-frame-complementary-overhead-demultiplex unit 4-6 detaches radio-frame-complementary overheads from radio-transfer-frame signals exchanged via the radio-exchange unit (not shown). The pointer-demultiplex unit 4-7 extracts a pointer distributed in the radio-frame-complementary overheads. The pointer-reconstruction unit 4-9 reconstructs pointer bytes from the extracted pointer.

The speed-conversion unit 4-8 attends to a process reverse to the process of the speed-conversion unit 4-2 of the transmitter side, and converts frame by frame the speed of radio transfer to the speed of STM-1-signal transfer. The received-pointer/destuff processing unit 4-10 applies the conventional pointer process and the conventional destuff process with respect to the STM signal and the reconstructed pointer bytes. A pointer value is obtained from the reconstructed pointer bytes, and a start position of the multiplex data in the payload is identified accordingly.

Figures 11A, 11B:
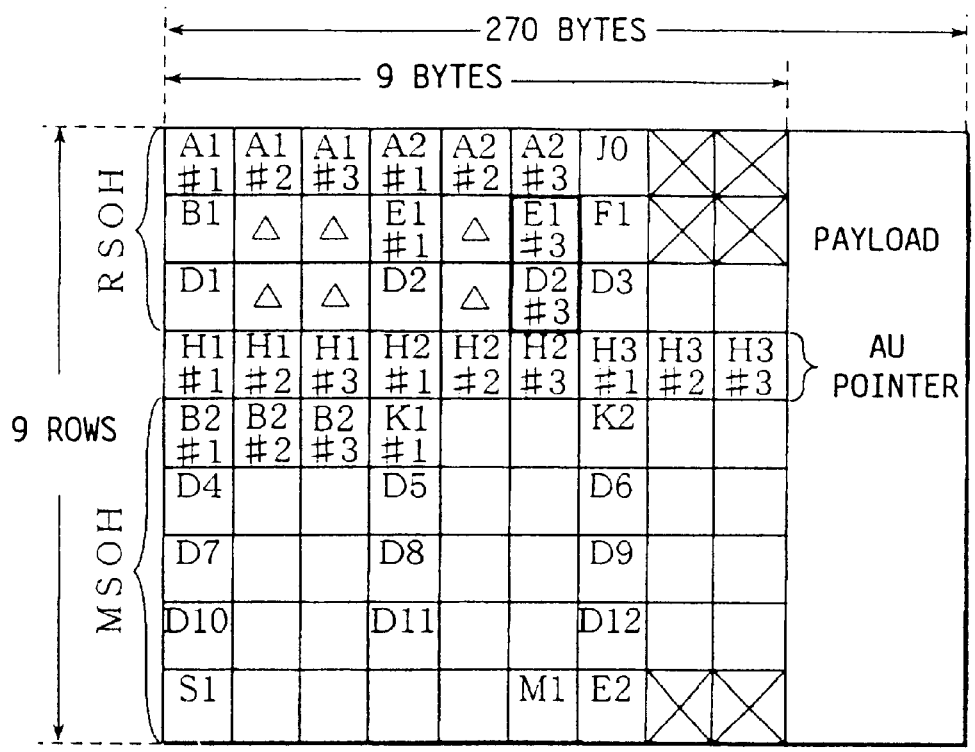
FIGS. 11A and 11B are illustrative drawings showing an arrangement of stuff-check bits according to a third embodiment of the present invention.

FIGS. 11A and 11B are illustrative drawings showing an arrangement of stuff-check bits according to a third embodiment of the present invention.

FIG. 11A shows the STM-1 frame format, where unused or undefined bytes thereof have stuff-check bits assigned thereto. For example, bytes E1#3 and D2#3 are used for allocating the stuff-check bits which are obtained from pointer bytes.

FIG. 11B shows the stuff-check bits (IDIDIDIDIDIDIDID) which are distributed to the bytes E1#3 and D2#3. As previously described, bits I and D in total of 10 bits together indicate a pointer value, and, at the same time, are used as stuff-check bits for checking presence/absence of an stuff operation, which is either the positive stuff operation or the negative stuff operation. In this embodiment, the stuff-check bits I and D are distributed to the unused or undefined bytes of the section overhead (SOH) in addition to the pointer bytes H1 and H2 where these stuff-check bits are stored in the same manner as in the related art. In this configuration, a likelihood of a burst error resulting in an erroneous pointer process can be reduced.

Figure 12A:
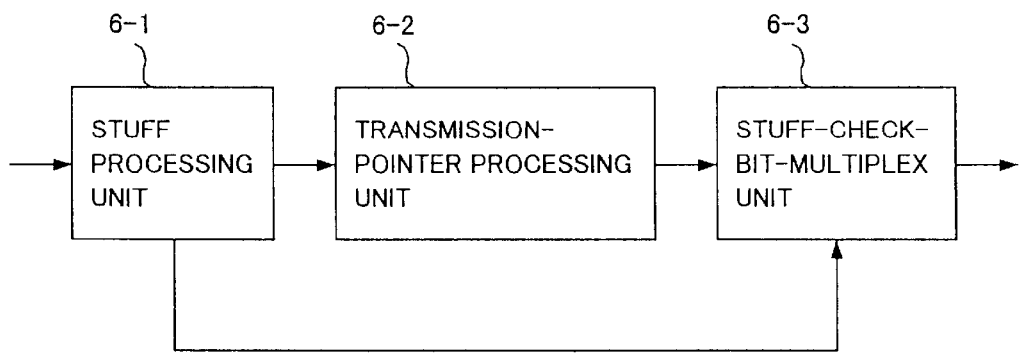
FIGS. 12A and 12B are block diagrams showing a configuration of a radio-side AU-pointer processing unit according to the third embodiment of the present invention.
Figure 12B:
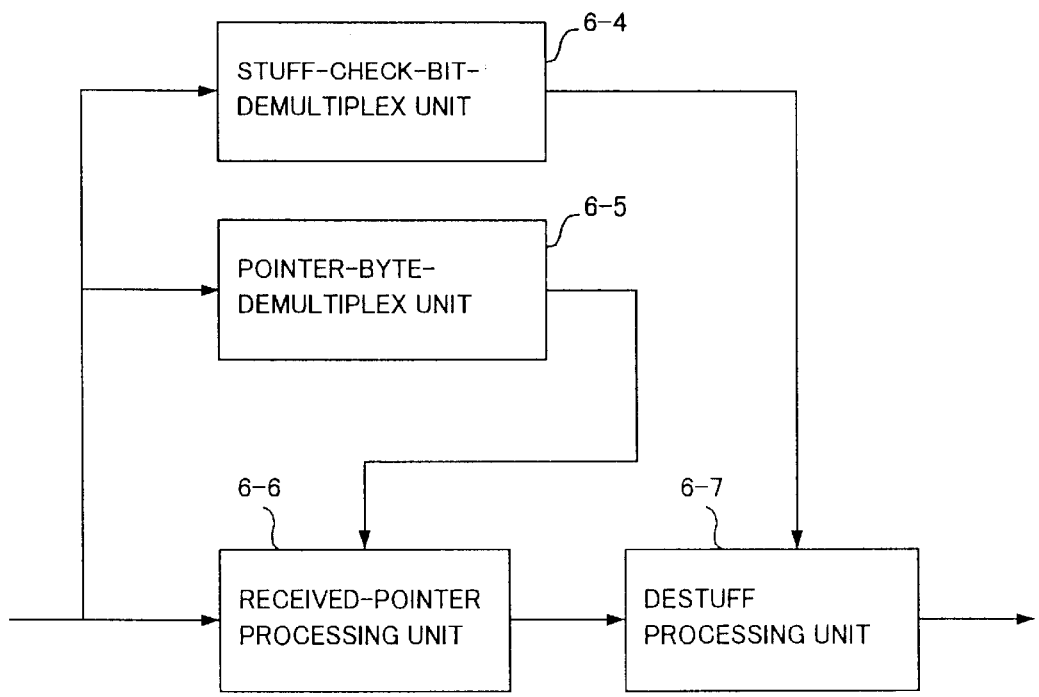

FIGS. 12A and 12B are block diagrams showing a configuration of the radio-side AU-pointer processing unit according to the third embodiment of the present invention. These figures show portions corresponding to the radio-side AU-pointer processing unit 2-14, and other portions of the radio device are omitted.

FIG. 12A shows a configuration of the transmitter side. This configuration includes a stuff processing unit 6-1, a transmission-pointer processing unit 6-2, and a stuff-check-bit-multiplex unit 6-3. FIG. 12B shows a configuration of the receiver side, and illustrates a stuff-check-bit-demultiplex unit 6-4, a pointer-byte-demultiplex unit 6-5, a received-pointer processing unit 6-6, and a destuff processing unit 6-7.

On the transmitter side shown in FIG. 12A, the stuff processing unit 6-1 performs a conventional stuff operation, and supplies stuff-check bits corresponding to the performed stuff operation to the stuff-check-bit-multiplex unit 6-3. The transmission-pointer processing unit 6-2 applies a conventional pointer process to the STM-1 signal. The stuff-check-bit-multiplex unit 6-3 distributes the stuff-check bits to respective stuff-check-bit positions provided in the unused bytes E1#3 and D2#3 in the section overhead, for example, in addition to allocating these stuff-check bits to normal positions thereof provided in the pointer bytes H1 nd H2.

In what follows, an example in which the stuff-check bits are used for notifying the receiver side of presence/absence of a stuff operation will be described. In the case of no stuff operation, all the bits I (8 bits) and all the bits D (8 bits) are set to zero in FIG. 11B. In the case of the positive stuff operation, all the bits I (8 bits) are set to 1 whereas all the bits D (8 bits) are set to 0. In the case of the negative stuff operation, all the bits I (8 bits) are set to 0 whereas all the bits D (8 bits) are set to 1.

On the receiver side shown in FIG. 12B, the stuff-check-bit-demultiplex unit 6-4 extracts the stuff-check bits from the STM-1 signal, and supplies the extracted stuff-check bits to the destuff processing unit 6-7. The pointer-byte-demultiplex unit 6-5 extracts pointer bytes from the STM-1 signal in the same manner as in the related art, and supplies the extracted pointer bytes to the received-pointer processing unit 6-6.

The received-pointer processing unit 6-6 applies the conventional pointer process to the STM-1 signal. The destuff processing unit 6-7 applies the conventional destuff process to the STM-1 signal supplied from the received-pointer processing unit 6-6 by using the stuff-check bits supplied from the stuff-check-bit-demultiplex unit 6-4.

An example of a stuff check conducted on the receiver side will be described in the following.

When no less than 5 bits among all the bits I are 1 and at least 5 bits among all the bits D are 0, the positive stuff operation is ascertained to be the process that has been performed on the transmitter side. When no less than 5 bits among all the bits I are 0 and at least 5 bits among all the bits D are 1, the negative stuff operation is ascertained to be the process that has been performed on the transmitter side. If neither of the above two cases is satisfied, no stuff operation is found to have been performed.

If neither the positive stuff operation nor the negative stuff operation is identified as a result of the stuff check described above, a pointer value is obtained from the pointer bytes, and a start position of the multiplex data in the payload is identified in the STM-1 frame. If either the positive stuff operation or the negative stuff operation is identified, a destuff operation corresponding to the identified stuff operation is performed with respect to the STM-1 frame. The destuff process itself is the same as that of the related art.

FIGS. 13A and 13B are illustrative drawings showing an arrangement of stuff-check bits according to a fourth embodiment of the present invention.

A radio-transfer frame 7-1 is the STM-1 frame described above plus radio-frame-complementary overheads 7-2. Stuff-check bits 7-3 are distributed in the radio-frame-complementary overheads 7-2.

The radio-transfer frame 7-1 is divided into a plurality of sub-frames, each of which is accompanied by two radio-frame-complementary overheads (S) 7-2 each comprised of two bit. The 1st, 2nd, and 3rd sub-frames, for example, may have the stuff-check bits "IDIDIDIDIDID" allocated to the two radio-frame-complementary overheads thereof when these stuff-check bits are obtained from the pointer. The stuff-check bits 7-3 arranged in this manner are properly distributed within the radio-transfer frame 7-1. This reduces an adverse effect of a burst error, and lessens a likelihood of an error of a pointer process.

Figure 14A:
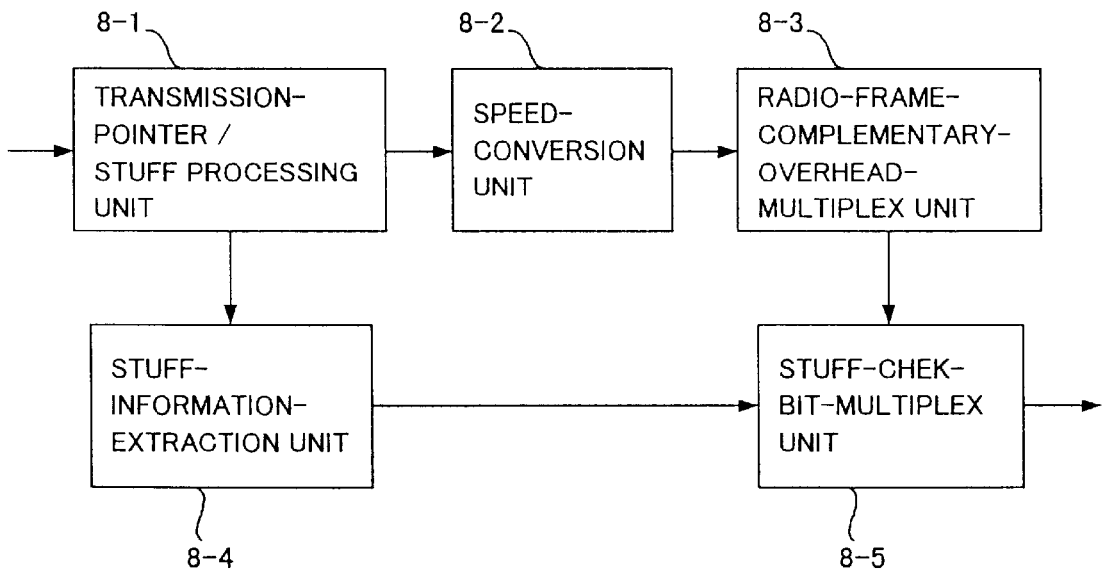
FIGS. 14A and 14B are block diagrams showing a configuration of a radio-side AU-pointer processing unit according to the fourth embodiment of the present invention.
Figure 14B:
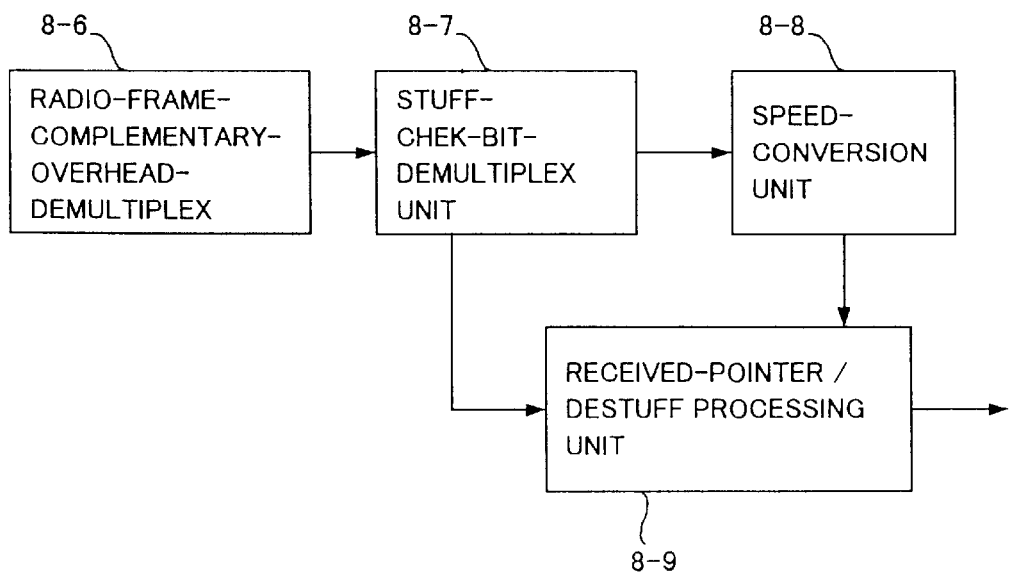

FIGS. 14A and 14B are block diagrams showing a configuration of the radio-side AU-pointer processing unit according to the fourth embodiment of the present invention. These figures show portions corresponding to the radio-side AU-pointer processing unit 2-14 of FIG. 8, and other portions of the radio device are omitted.

FIG. 14A shows a configuration on the transmitter side. This configuration includes a transmission-pointer/stuff processing unit 8-1, a speed-conversion unit 8-2 for converting a speed to that of radio-transfer, a radio-frame-complementary-overhead-multiplex unit 8-3, a stuff-information-extraction unit 8-4, and a stuff-check-bit-multiplex unit 8-5.

FIG. 14B shows a configuration on the receiver side. This configuration includes a radio-frame-complementary-overhead-demultiplex unit 8-6, a stuff-check-bit-demultiplex unit 8-7, a speed-conversion unit 8-8 for converting a transfer speed from that of the radio transfer to that of the STM-1 transfer, a received-pointer/destuff processing unit 8-9.

In FIG. 14A, the transmission-pointer/stuff processing unit 8-1 applies the conventional pointer process and the conventional stuff process to an STM-1 signal supplied thereto. The speed-conversion unit 8-2 converts the STM-1 signal frame by frame so as to comply with the speed of radio transfer. The radio-frame-complementary-overhead-multiplex unit 8-3 attaches radio-frame-complementary overheads (RFCOH) (i.e., radio-transfer overheads) to the STM-1 frame.

The stuff-information-extraction unit 8-4 extracts stuff information from the STM-1 signal, and supplies the stuff information to the stuff-check-bit-multiplex unit 8-5. The stuff-check-bit-multiplex unit 8-5 distributes each of stuff-check bits to a respective stuff-check-bit position of the radio-frame-complementary overheads. The STM-1 frame having the radio-frame-complementary overheads attached thereto is transmitted from the radio-exchange unit (not shown).

The speed conversion by the speed-conversion unit 8-2 is performed frame by frame, and the stuff information for a given frame is written into the given frame alone and no frame else. This allows the receiver side to carry out a destuff process of a given frame within the given frame.

On the receiver side shown in FIG. 14B, the radio-frame-complementary-overhead-demultiplex unit 8-6 detaches the radio-frame-complementary overheads from radio-transfer-frame signals. The stuff-check-bit-demultiplex unit 8-7 extracts the stuff-check bits distributed in the radio-frame-complementary overheads. The speed-conversion unit 8-8 converts frame by frame the speed of radio transfer to the speed of STM-1-signal transfer. The received-pointer/destuff processing unit 8-9 applies the conventional pointer process and the conventional destuff process with respect to the STM-1 signal and the extracted stuff-check bits.

In what follows, an example in which the stuff-check bits are used for notifying the receiver side of a stuff operation will be described. In the case of no stuff operation, all the bits I (6 bits) and all the bits D (6 bits) are set to zero in FIG. 13B. In the case of the positive stuff operation, all the bits I (6 bits) are set to 1 whereas all the bits D (6 bits) are set to 0. In the case of the negative stuff operation, all the bits I (6 bits) are set to 0 whereas all the bits D (6 bits) are set to 1. Other pointer processes other than the stuff-check operation are performed in the same manner as in the related art.

An example of a stuff check conducted on the receiver side will be described in the following.

When no less than 4 bits among all the bits I are 1 and at least 4 bits among all the bits D are 0, the positive stuff operation is ascertained to be the process that has been performed on the transmitter side. When no less than 4 bits among all the bits I are 0 and at least 4 bits among all the bits D are 1, the negative stuff operation is ascertained to be the process that has been performed on the transmitter side. If neither of the above two cases is satisfied, no stuff operation is found to have been performed.

If neither the positive stuff operation nor the negative stuff operation is identified as a result of the stuff check described above, a pointer value is obtained from the pointer bytes, and a start position of the multiplex data in the payload is identified in the STM-1 frame. If either the positive stuff operation or the negative stuff operation is identified, a destuff operation corresponding to the identified stuff operation is performed with respect to the STM-1 frame. The destuff process itself is the same as that of the related art.

In the following, a fifth embodiment of the present invention will be described. In this embodiment, a plurality of pointers are transmitted by allocating them to radio-frame-complementary overheads, and the receiver side takes a majority vote among the plurality of the pointers in order to obtain a correct pointer. The possibility of the plurality of pointers included in the same frame suffering the same error is quite remote. The majority vote of the plurality of pointers insures that an erroneous pointer process is less likely to be performed even when a burst error occurs in the radio frame.

Figure 15A:
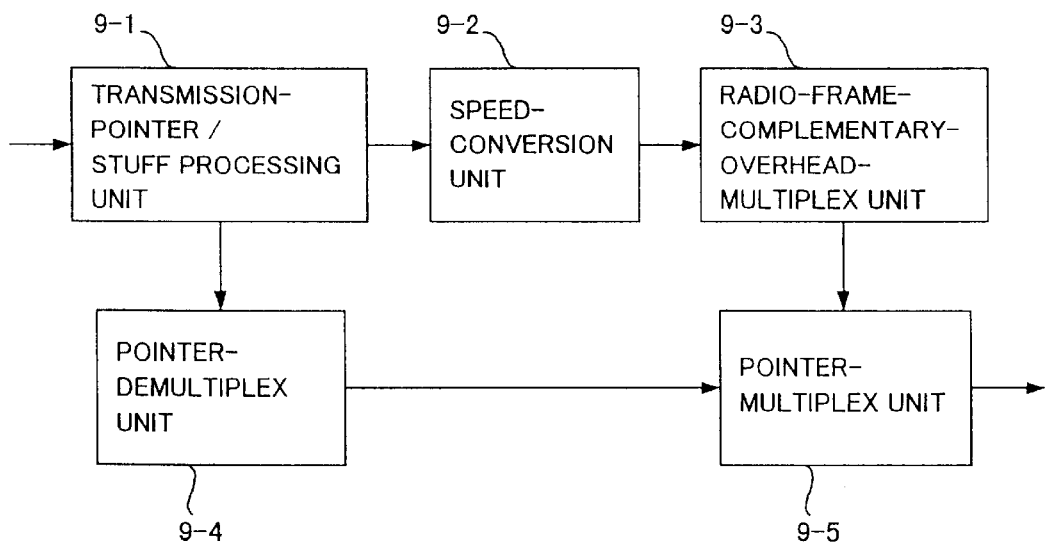
FIGS. 15A and 15B are block diagrams showing a configuration of a radio-side AU-pointer processing unit according to a fifth embodiment of the present invention.
Figure 15B:
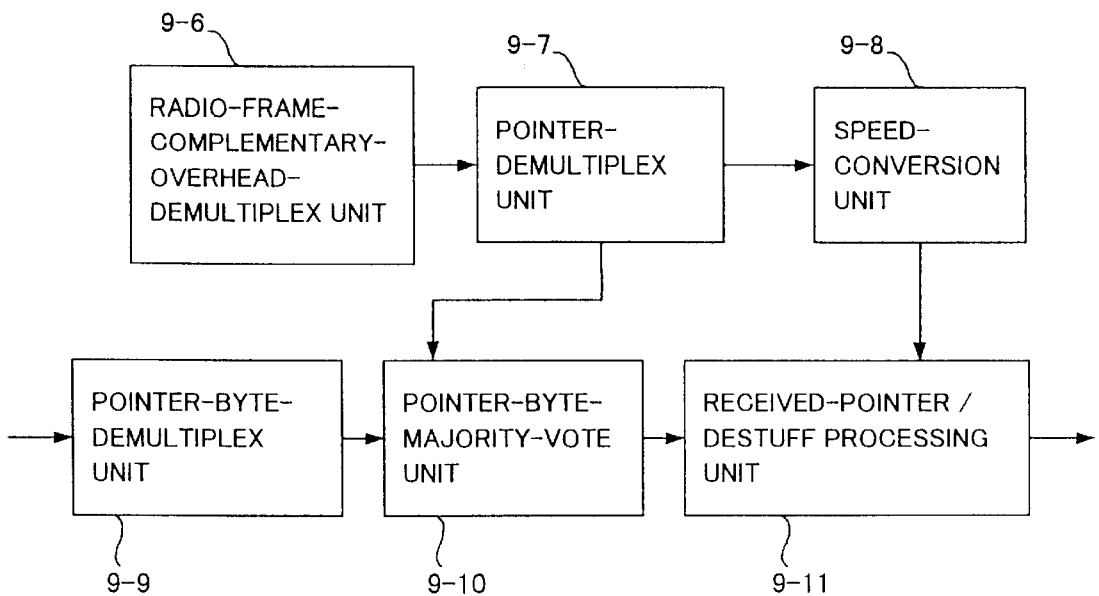

FIGS. 15A and 15B are block diagrams showing a configuration of the radio-side AU-pointer processing unit according to the fifth embodiment of the present invention.

FIG. 15A shows a configuration on the transmitter side. This configuration includes a transmission-pointer/stuff processing unit 9-1, a speed-conversion unit 9-2 for converting a speed into that of radio-transfer, a radio-frame-complementary-overhead-multiplex unit 9-3, a pointer-demultiplex unit 9-4, and a pointer-multiplex unit 9-5.

FIG. 15B shows a configuration on the receiver side. This configuration includes a radio-frame-complementary-overhead-demultiplex unit 9-6, a pointer-demultiplex unit 9-7, a speed-conversion unit 9-8 for converting a transfer speed from that of the radio transfer to that of the STM-1 transfer, a pointer-byte-demultiplex unit 9-9, a pointer-byte-majority-vote unit 9-10, and a received-pointer/destuff processing unit 9-11.

FIGS. 16A through 16C are illustrative drawings showing an arrangement of a plurality of pointers according to the fifth embodiment of the present invention.

In the figures, a radio-transfer frame 10-1 is the STM-1 frame plus radio-frame-complementary overheads (RFCOH) 10-2. Pointers 10-31 and 10-32 are distributed in the radio-frame-complementary overheads 10-2.

On the transmitter side, the transmission-pointer/stuff processing unit 9-1 applies the conventional pointer process and the conventional stuff process to an STM-1 signal supplied thereto. The speed-conversion unit 9-2 attends to a frame-wise speed conversion so as to achieve a compliance with the speed of radio transfer. The radio-frame-complementary-overhead-multiplex unit 9-3 attaches radio-frame-complementary overheads (RFCOH) to the STM-1 signal, and supplies the signal to the pointer-multiplex unit 9-5.

The pointer-demultiplex unit 9-4 extracts pointer bytes from the STM-1 signal supplied from the transmission-pointer/stuff processing unit 9-1, and supplies the pointer bytes to the pointer-multiplex unit 9-5.

The pointer-multiplex unit 9-5 distributes each bit of the pointers 10-31 and 10-32 to the radio-frame-complementary overheads attached to the STM-1 signal where the pointers 10-31 and 10-32 are the same as the pointer extracted by the pointer-demultiplex unit 9-4. The obtained signal is then transmitted to the partner radio device.

On the receiver side, the radio-frame-complementary-overhead-demultiplex unit 9-6 extracts the radio-frame-complementary overheads. The pointer-demultiplex unit 9-7 extracts the pointers 10-31 and 10-32 distributed in the radio-frame-complementary 1overheads, and reconstructs the pointer bytes to send them to the pointer-byte-majority-vote unit 9-10.

The speed-conversion unit 9-8 attends to a frame-wise speed conversion to obtain the STM-1 signal, and supplies the same to the received-pointer/destuff processing unit 9-11. The pointer-byte-demultiplex unit 9-9 extracts the pointer bytes H1 and H2 from the section overhead (SOH) of the STM-1 signal, and supplies the pointer bytes H1 and H2 to the pointer-byte-majority-vote unit 9-10.

The pointer-byte-majority-vote unit 9-10 takes a majority vote among the pointer bytes H1 and H2 and the pointers 10-31 and 10-32 when the pointer bytes H1 and H2 of the section overhead (SOH) are supplied from the pointer-byte-demultiplex unit 9-9, and the pointers 10-31 and 10-32 are supplied from the pointer-demultiplex unit 9-7. The pointer-byte-majority-vote unit 9-10 identifies a correct pointer via the majority vote, and sends it to the received-pointer/destuff processing unit 9-11. The received-pointer/destuff processing unit 9-11 identifies a start position of data in the payload by using pointer bytes of the obtained pointer. Here, a pointer-byte process following the process of a majority vote is the same as in the related art.

According to the fifth embodiment of the present invention, a plurality of identical pointers are distributed and transmitted, and the receiver side takes a majority vote among the received pointers. Even if some of the pointers suffer a burst error, the majority vote insures a detection of a correct pointer, thereby reducing a likelihood of an error of a pointer process.

Further, the international standards or the like may impose a restriction on the use of unused areas of the section overhead (SOH) in the future. Even in such an event, this embodiment is not affected since it uses the radio-frame-complementary overheads.

FIGS. 17A through 17E are illustrative drawings for explaining operations of the transmitter side according to the fifth embodiment of the present invention.

As described above, the transmission-pointer/stuff processing unit 9-1 processes the transmission pointer (11-1), and the pointer-demultiplex unit 9-4 detects the pointer value. The multiplex processing is performed with respect to the multiplex-section overheads (MSOH) (11-2), and the multiplexing of the regenerator-section overhead (RSOH) is attended to (11-3).

Further, a plurality of pointers having the pointer value obtained above are arranged in the radio-frame-complementary overheads (RFCOH) to generate a radio frame (speed conversion) (11-4). Modulation of a carrier wave is conducted by using the radio-transfer-frame signal (11-5), and a resulting radio signal is transmitted to a partner radio device (11-6).

Figure 17A:
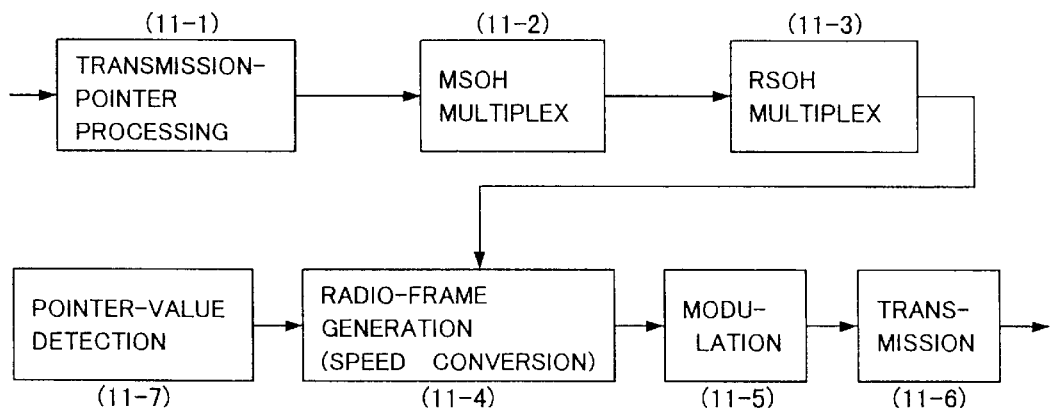
FIGS. 17A through 17E are illustrative drawings for explaining operations of the transmitter side according to the fifth embodiment of the present invention.
Figure 17B:
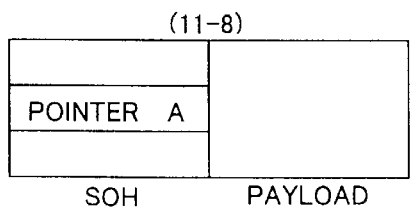
Figure 17C:
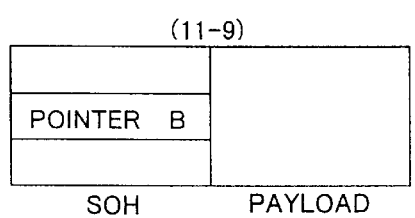
Figure 17D:
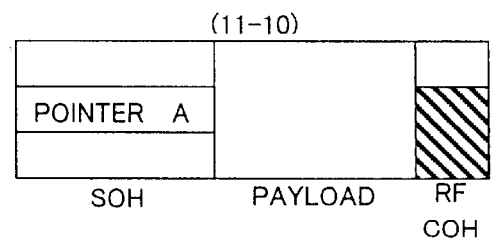
Figure 17E:
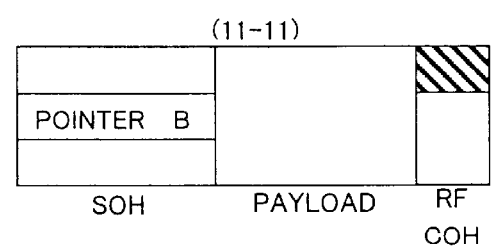
Figure 18A:
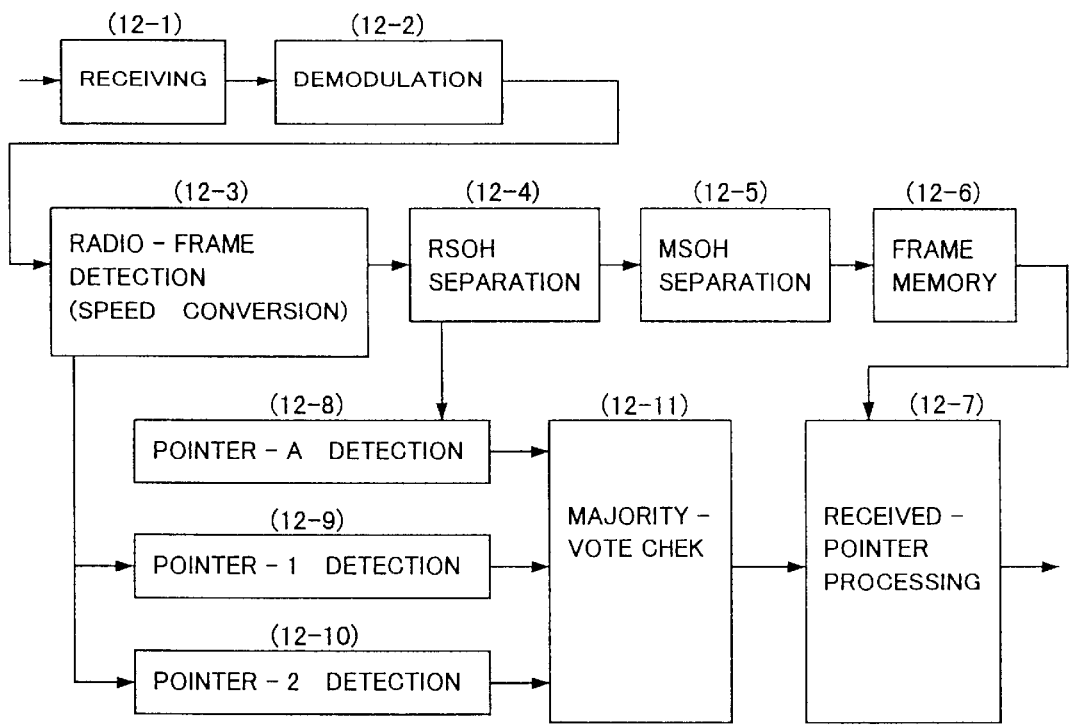
FIGS. 18A through 18E are illustrative drawings for explaining operations of the receiver side according to the fifth embodiment of the present invention.
Figure 18B:
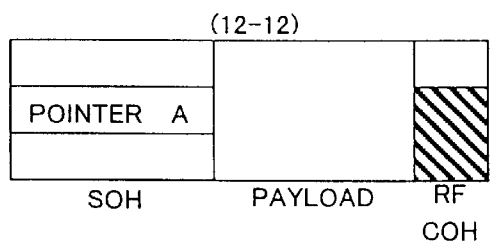
Figure 18C:
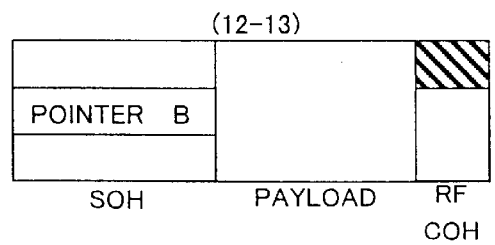
Figure 18D:
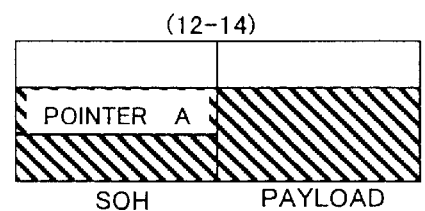
Figure 18E:
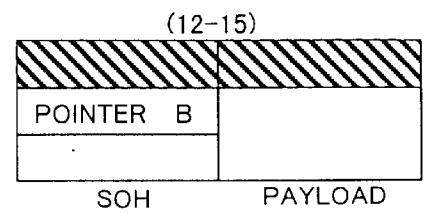

STM-1 frames 11-8 and 11-9 having respective pointer values A and B are transmitted as part of radio-transfer frames 11-10 and 11-11, respectively, along with the attached radio-frame-complementary overheads (RFCOH). Each of the radio-frame-complementary overheads includes a plurality of pointers identical to the pointer provided in the STM-1 frame. These pointers are accommodated in a portion as shown in FIGS. 17D and 17E as hatched areas.

FIGS. 18A through 18E are illustrative drawings for explaining operations of the receiver side according to the fifth embodiment of the present invention.

A radio signal from a partner radio device is received (12-1) and demodulated (12-2), and a radio-transfer frame is detected (speed conversion) (12-3). At this stage of operations, two pointers are extracted (12-9, 12-10) from the radio-frame-complementary overheads (RFCOH) of radio-transfer frames 12-12 and 12-13. The hatched regions of the radio-transfer frames 12-12 and 12-13 indicate portions where these two pointers are positioned.

Then, the regenerator-section overhead (RSOH) is separated (12-4), and the multiplex-section overhead (MSOH) is separated (12-5). The STM-1 frame is stored in a frame memory (12-6).

Assuming that the frame memory has one-frame's worth of memory space, data of the hatched regions of the STM-1 frames 12-14 and 12-15, where the combined data has one frame's worth of data amount, is stored in the frame memory when the STM-1 frame 12-14 of the pointer A and the STM-1 frame 12-15 of the pointer B are successively supplied.

Further, when the regenerator-section overhead (RSOH) is separated (12-4), the pointer A is extracted from the AU-pointer portion (12-8). A majority vote (12-11) is taken among the pointer A and the two pointers, and the received-pointer processing (12-7) is performed based on the result of the majority vote.

In the following, a sixth embodiment of the present invention will be described. The sixth embodiment uses a J1 byte indicated by the pointer bytes H1 and H2 to make a stuff check. Here, the J1 byte is located at the start position of the multiplex data in the payload.

A likelihood of all the pointer bytes H1 and H2 and the J1 byte sustaining errors in the same STM-1 frame is quite remote. A stuff check based on the pointer bytes H1 and H2 and a stuff check based on the J1 byte thus may be combined to enhance reliability of the stuff check.

This is quite advantageous since a conventional stuff check has not been provided with any protection against errors. This embodiment affords a stuff check a protection against errors by using the pointer bytes H1 and H2 and the J1 byte.

The J1 byte is located at a start position of a pass overhead (POH) of a virtual container, which is contained in the payload of an STM frame. The J1 byte is used for monitoring a pass passage, and a plurality of J1 bytes together make up a trace signal indicative of pass routes.

FIG. 19 is an illustrative drawing showing a frame format of a trace signal. The frame format of a trace signal defines a multi frame that is comprised of 16 J1 bytes taken from 16 STM frames. In the figure, multi-frame-indicator bits $F_o$ through $F_F$ together from a predetermined multi-frame pattern. $C_1$ through $C_7$ are CRC-7 parity bits. Trace-signal data $X_{11}$ through $X_{F7}$ indicate pass routes, and are represented as character codes such as ASCII codes.

Figure 20:
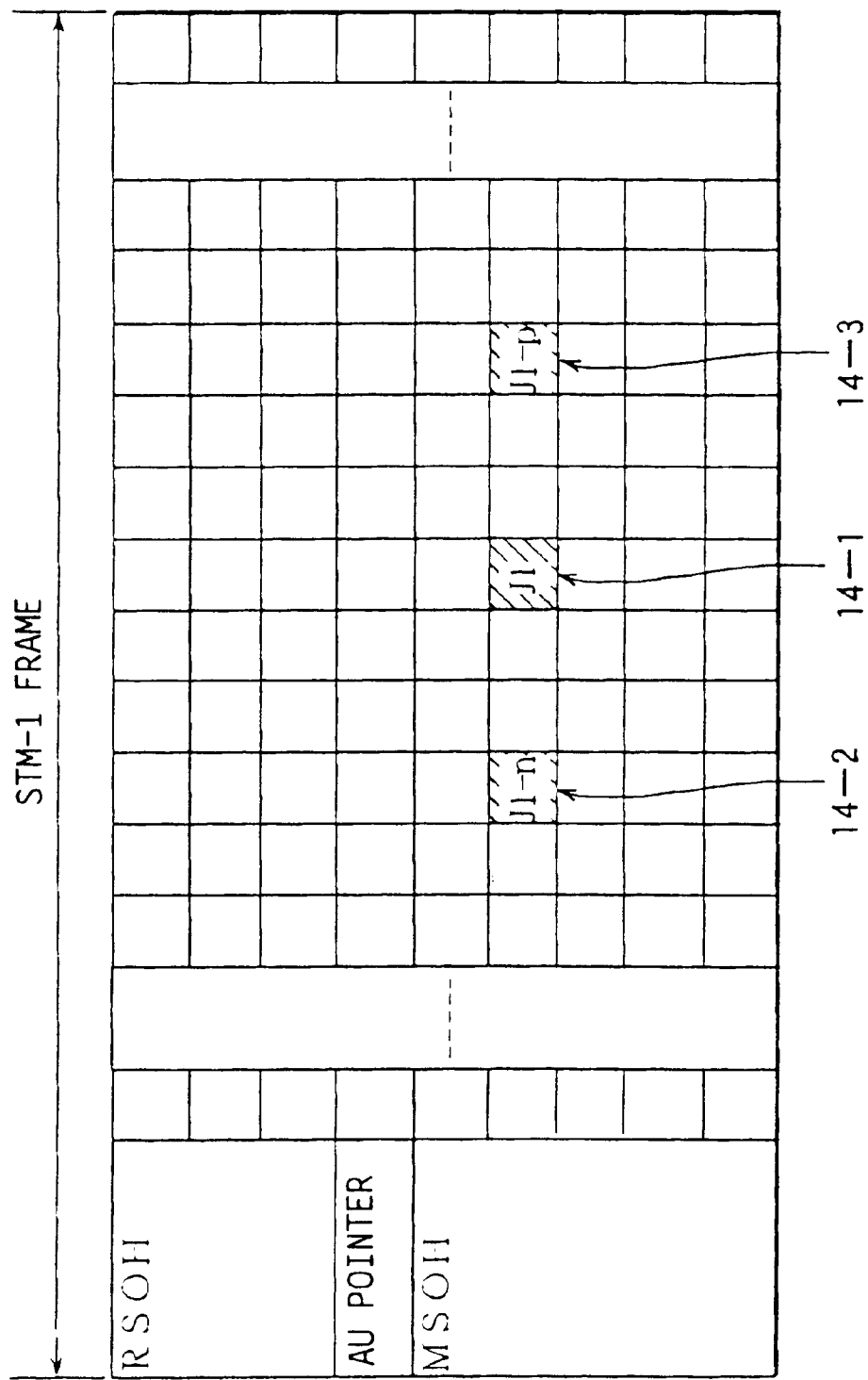
FIG. 20 is an illustrative drawing showing an arrangement of a J1 byte in an STM-1 frame.

FIG. 20 is an illustrative drawing showing an arrangement of a J1 byte in an STM-1 frame.

As shown in the figure, the J1 byte is allocated to a position 14-1 in the STM-1 frame when no stuff operation is conducted. Such a position is determined by the pointer bytes H1 and H2. A byte J1-n indicates a position 14-2 where the J1 byte is located when the negative stuff operation is conducted. A byte J1-p indicates a position 14-3 of the J1 byte in the case of the positive stuff operation.

The transmitter side to send a trace signal transmits the character codes $X_{11}$ through $X_{F7}$ set in accordance with the frame format shown in FIG. 19. The receiver side has a predetermined set of character codes that is expected to be received as a trace signal. The receiver side make a comparison between the predetermined set of character codes and character codes of an actually received trace signal, and makes a stuff check based on the results of comparison.

Figure 21:
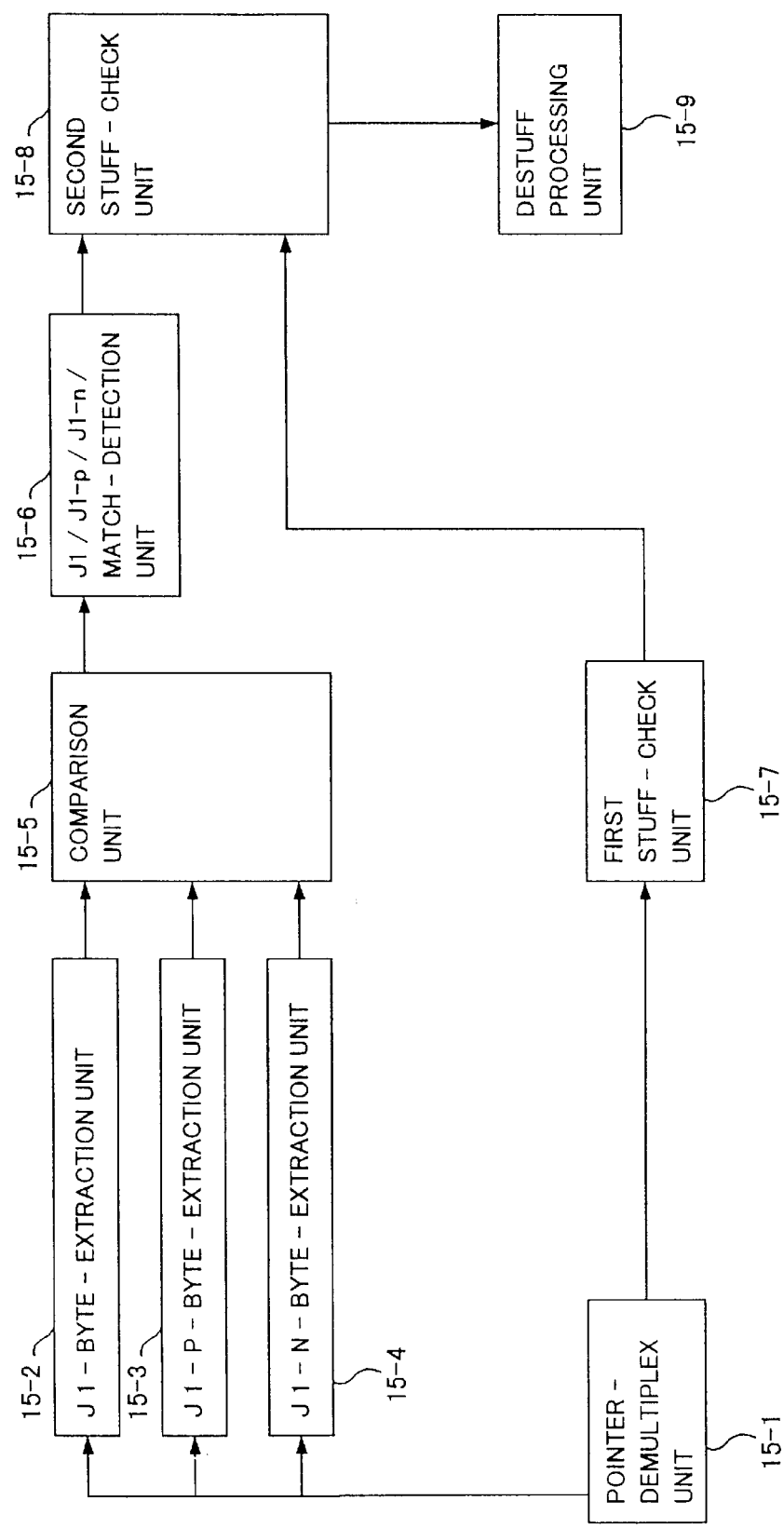
FIG. 21 is a block diagram showing a configuration of the receiver side according to a sixth embodiment of the present invention.

FIG. 21 is a block diagram showing a configuration of the receiver side according to the sixth embodiment of the present invention. A configuration and operations of the transmitter side are the same as those of the related art, and a description thereof will be omitted.

The configuration of FIG. 21 includes a pointer-demultiplex unit 15-1, a J1-byte-extraction unit 15-2, a J1-p-byte-extraction unit 15-3, a J1-n-byte-extraction unit 15-4, a comparison unit 15-5 for making a comparison with the expected set of character codes, a match-detection unit 15-6 for detecting a match between each of the J1 byte, the J1-p byte, and the J1-n byte and the expected set of character codes, a first stuff-check unit 15-7, a second stuff-check unit 15-8, and a destuff processing unit 15-9.

The pointer-demultiplex unit 15-1 extracts the pointer bytes H1 and H2 in the same manner as in the related art. The pointer bytes H1 and H2 indicate a position of the J1 byte, and indicate the byte J1-p or J1-n when a stuff operation is performed. The J1-byte-extraction unit 15-2, the J1-p-byte-extraction unit 15-3, and the J1-n-byte-extraction unit 15-4 extract the J1 byte, the J1-p byte, and the J1-n byte, respectively, from respective byte positions thereof.

The comparison unit 15-5 compares the predetermined set of character codes expected to match the trace signal data with each of the J1 byte, the J1-p byte, and the J1-n byte extracted as described above. The match-detection unit 15-6 detects a match, if any, with respect to each of the J1 byte, the J1-p byte, and the J1-n byte, and send the results of the match to the second stuff-check unit 15-8.

The first stuff-check unit 15-7 performs a conventional stuff-check operation based on the pointer bytes H1 and H2 extracted by the pointer-demultiplex unit 15-1, and sends the results of the check to the second stuff-check unit 15-8.

The second stuff-check unit 15-8 makes a stuff check based on the results of the match supplied from the match-detection unit 15-6 with regard to the J1/J1-p/J1-n byte as well as the results of the check supplied from the first stuff-check unit 15-7. This stuff check is performed to produce a check result as shown in FIGS. 22A and 22B.

FIG. 22A shows a case in which the positive/negative stuff operation is identified if the results of the match with regard to the J1/J1-p/J1-n byte match the results of the check supplied from the first stuff-check unit 15-7, and no stuff operation is identified if they do not match. FIG. 22B shows a case in which the results of the match supplied from the match-detection unit 15-6 with regard to the J1/J1-p/J1-n byte take precedence in making a stuff check.

When making a stuff check as shown in FIG. 22A or 22B, it is ascertained that a burst error damaged the J1 byte, the J1-p byte, and the J1-n byte if none of these bytes matches the predetermined set. In this case, the results of the check supplied from the first stuff-check unit 15-7 are solely used in making a stuff check. Further, if more than one of the J1 byte, the J1-p byte, and the J1-n byte gives a match, the results of the check supplied from the first stuff-check unit 15-7 are solely used since a correct position of the J1 byte cannot be identified from the output of the match-detection unit 15-6.

In this manner, the character codes of the J1 bytes are involved in the process of making a stuff check. A comparison of the character codes with the predetermined set of the character codes is used for estimating a stuff operation, and a check is made as to whether the estimate of a stuff operation and the stuff operation indicated by the pointer bytes H1 and H2 match. If no match is obtained, it is ascertained that neither the positive stuff operation or the negative stuff operation has been performed based on a premise that damages caused by burst errors are present in the pointer bytes H1 and H2.

The stuff check described above reduces a likelihood of an erroneous stuff operation being performed when a burst error is generated in the pointer bytes H1 and H2.

As described above, the present invention distributes each bit of the pointer bytes or the stuff-check bits, so that the pointer bytes or the stuff-check bits are less likely to be entirely damaged even when a burst error occurs. Therefore, an erroneous pointer process including an erroneous stuff operation can be reduced on the receiver side.

In implementing the present invention, unused bytes/bits or undefined bytes in the section overhead SOH of the STM-n frame are used for achieving the distributed arrangement, so that nothing deviates from the STM-n standard formats. Further, when the distributed arrangement is achieved by use of the radio-frame-complementary overheads, the STM-n frame is transmitted without any change from the related-art practice, so that processes on the receiver side will be easier to implement.

Further, a plurality of identical pointers are distributed and transmitted, and a majority vote is taken on the receiver side between the plurality of received pointers, thereby detecting a correct pointer. This reduces a likelihood of an error of a pointer process.

Moreover, the character codes of J1 bytes are involved in a stuff check, such that a comparison of the received character codes with the expected character codes permits estimation of a stuff operation, and the estimate of a stuff operation is then used for making a stuff check. This reduces a likelihood of an error of a stuff process.

Further, the present invention is not limited to these embodiments, but various variations and modifications may be made without departing from the scope of the present invention.

What is claimed is:

1. A method of a pointer signal process in an SDH radio device which receives an STM frame having a section overhead and a payload therein, said section overhead including a pointer signal having a plurality of pointer bytes, comprising the steps of:

distributing said pointer signal by storing said plurality of pointer bytes both at a standard location of bytes in said section overhead of said STM frame and at respective separate and non-consecutive locations in unused bytes or undefined bytes in said section overhead of said STM frame, said pointer signal indicating a start position of multiplex data in said payload of said STM frame; and transmitting said STM frame to said SDH radio device.

2. A method of a pointer signal process in an SDH radio device which receives an STM frame having a section overhead and a payload therein along with radio-frame-complementary overheads attached to said STM frame, said section overhead including a pointer signal having a plurality of pointer bytes, comprising the steps of:

distributing said pointer signal by storing said plurality of pointer bytes both at a standard position in said section overhead of said STM frame and at respective separate and non-consecutive locations in said radio-frame-complementary overheads attached to said STM frame, said pointer signal indicating a start position of multiplex data in said payload of said STM frame; and transmitting said STM frame to said SDH radio device.

3. A method a pointer signal process in an SDH radio device which receives an STM frame having a section overhead and a payload therein, said section overhead including a pointer signal having a plurality of pointer bytes, comprising the steps of:

generating stuff-check bits indicative of type of a stuff operation based on said plurality of pointer bytes, said pointer signal indicating a start position of multiplex data in said payload of said STM frame;

distributing said stuff-check bits by storing ones of said stuff-check bits at respective separate and non-consecutive locations in unused bytes or undefined bytes in said section overhead of said STM frame, in addition to allocating said pointer signal both to a standard position thereof in said section overhead of said STM frame and to respective separate and non-consecutive locations in unused bytes or undefined bytes in said section overhead of said STM frame; and transmitting said STM frame to said SDH radio device.

4. A method of a pointer signal process in an SDH radio device which receives an STM frame having a section overhead and a payload therein along with radio-frame-complementary overheads attached to said STM frame, said section overhead including a pointer signal having a plurality of pointer bytes, comprising the steps of:

generating stuff-check bits indicative of type of a stuff operation based on said plurality of pointer bytes, said pointer indicating a start position of multiplex data in said payload of said STM frame;

distributing said stuff-check bits by storing ones of said stuff-check bits at respective separate and non-consecutive locations in said radio-frame-complementary overheads attached to said STM frames in addition to allocating said stuff-check bits and said pointer to a standard position thereof in said section overhead of said STM frame; and transmitting said STM frame to said SDH radio device.

5. A method of preventing an error of a pointer process in an SDH radio device which receives an STM frame having a section overhead and a payload therein along with radio-frame-complementary overheads attached to said STM frame, comprising the steps of:

distributing a plurality of pointers in said radio-frame-complementary overheads attached to said STM frame in addition to allocating a second pointer in said section overhead of said STM frame, said pointers being identical to said second pointer which indicates a start position of multiplex data in said payload of said STM frame;

transmitting said STM frame to said SDH radio device; and taking a majority vote among said plurality of pointers and said second pointer on a side of said SDH radio device.

6. A method of preventing an error of a pointer process in an SDH radio device which receives an STM frame having a section overhead and a payload therein, comprising the steps of:

receiving a pointer indicative of a start position of multiplex data in said payload of said STM frame and indicative of a type of a stuff operation, said start position depending on said type of a stuff operation;

making a first check regarding said type of a stuff operation based on said pointer;

making a comparison of a set of data extracted from said payload at said start position of multiplex data over a predetermined number of STM frames with a predetermined set of expected data, said comparison being made with respect to each of different start positions corresponding to different types of stuff operations; and making a second check to identify said type of said stuff operation based on said first check and said comparison.

7. The method as claimed in claim 6, wherein said set of data comprises a trace signal of pass overheads of said STM frames.

8. A device for conducting radio communication based on an SDH system by exchanging an STM frame having a section overhead and a payload therein, said section overhead including a pointer signal having a plurality of pointer bytes, said device comprising:

a pointer-arrangement-conversion unit which arranges each of the plurality of pointer bytes in such an arrangement as to correspond to a dedicated sequence of bytes in said section overhead of said STM frame and to unused bytes or undefined bytes in said section overhead of said STM frame, said pointer signal indicating a start position of multiplex data in said payload of said STM frame;

a frame-memory unit which accumulates at least one STM frame's worth of data; and a pointer-multiplex unit which multiplexes said pointer signal to said STM frame supplied from said frame-memory unit so as to distribute said pointer signal by storing said plurality of pointer bytes at respective separate and non-consecutive locations in said unused bytes or undefined bytes in said section overhead of said STM frame.

9. A device for conducting radio communication based on an SDH system by exchanging an STM frame having a section overhead and a payload therein, said section overhead including a pointer signal having a plurality of-pointer bytes, said device comprising:

a radio-frame-complementary-overhead-multiplex unit which attaches radio-frame-complementary overheads to said STM frame;

a pointer-demultiplex unit which extracts from said STM frame said pointer signal indicative of a start position of multiplex data in said payload of said STM frame; and a pointer-multiplex unit which distributes said pointer signal extracted by said pointer-demultiplex unit by storing said plurality of pointer bytes at respective separate and non-consecutive locations in said radio-frame-complementary overheads attached to said STM frame by said radio-frame-complementary-overhead-multiplex unit, said STM frame also storing said plurality of pointer bytes at a standard position thereof in said section overhead of said STM frame.

10. A device for conducting radio communication based on an SDH system by exchanging an STM frame having a section overhead and a payload therein, said section overhead including a pointer signal having a plurality of pointer bytes, said device comprising:

a stuff processing unit which performs a stuff operation, and generates stuff-check bits corresponding to said stuff operation based on said plurality of pointer bytes, said pointer signal indicative of a start position of multiplex data in said payload of said STM frame; and a stuff-check-bit-multiplex unit which distributes said stuff-check bits by storing ones of said stuff-check bits at respective separate and non-consecutive locations in unused bytes or undefined bytes in said section overhead of said STM frame, wherein said pointer is allocated both to a standard position thereof in said section overhead of said STM frame and to respective separate and non-consecutive locations in unused bytes or undefined bytes in said section overhead of said STM frame.

11. A device for conducting radio communication based on an SDH system by exchanging an STM frame, said device comprising:

a stuff-information-extraction unit which extracts stuff-check bits corresponding to a stuff operation from said STM frame;

a radio-frame-complementary-overhead-multiplex unit which attaches radio-frame-complementary overheads to said STM frame; and a stuff-check-bit-multiplex unit which distributes said stuff-check bits extracted by said stuff-information-extraction unit by storing ones of said stuff-check bits at respective separate and non-consecutive locations in said radio-frame-complementary overheads attached to said STM frame by said radio-frame-complementary-overhead-multiplex unit, in addition to allocating said stuff-check bits and said pointer to a standard position thereof in said section overhead of said STM frame.

12. A device for conducting radio communication based on an SDH system by exchanging an STM frame having a section overhead and a payload therein, said device comprising:

a pointer-demultiplex unit which extracts from said STM frame a pointer indicative of a start position of multiplex data in said payload of said STM frame;

a radio-frame-complementary-overhead-multiplex unit which attaches radio-frame-complementary overheads to said STM frame;

a pointer-multiplex unit which allocates a plurality of pointers to said radio-frame-complementary overheads attached to said STM frame by said radio-frame-complementary-overhead-multiplex unit, said plurality of pointers identical to said pointer, a receiver-side pointer-demultiplex unit which extracts said plurality of pointers from received radio-frame-complementary overheads sent from another device for conducting radio communication;

a pointer-byte-demultiplex unit which extracts said pointer from a received STM frame sent from said another device;

a pointer-byte-majority-vote unit which takes a majority vote among said plurality of pointers extracted from said received radio-frame-complementary overheads and said pointer extracted from said received STM frame.

13. A device for conducting radio communication based on an SDH system by exchanging an STM frame having a section overhead and a payload therein, said device comprising:

a pointer-demultiplex unit which extracts a pointer indicative of a start position of multiplex data in said payload of said STM frame and indicative of a type of stuff operation, said start position depending on said type of stuff operation;

a first stuff-check unit which makes a first check regarding said type of a stuff operation based on said pointer;

a comparison unit which makes a comparison oaf a set of data extracted from said payload at said start position of multiplex data over a predetermined number of STM frames with a predetermined set of expected data, said comparison being made with respect to each of different start positions corresponding to different types of stuff operations; and a second-check unit which makes a second check to identify said type of said stuff operation based on said first check and said comparison.

14. The device as claimed in claim 13, wherein said set of data comprises a trace signal of pass overheads of said STM frames.

* * * * *